(12) United States Patent
Takahashi et al.

(10) Patent No.: US 12,287,263 B2
(45) Date of Patent: Apr. 29, 2025

(54) SAMPLE PURIFICATION APPARATUS AND ANALYSIS SYSTEM

(71) Applicant: Shimadzu Corporation, Kyoto (JP)

(72) Inventors: Kazuteru Takahashi, Kyoto (JP); Masahito Ueda, Kyoto (JP); Hidefumi Yamagata, Kyoto (JP); Shinsuke Inoue, Kyoto (JP); Shinji Hamasaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/013,397

(22) PCT Filed: Mar. 9, 2021

(86) PCT No.: PCT/JP2021/009167
§ 371 (c)(1),
(2) Date: Dec. 28, 2022

(87) PCT Pub. No.: WO2022/004062
PCT Pub. Date: Jan. 6, 2022

(65) Prior Publication Data
US 2023/0221225 A1    Jul. 13, 2023

(30) Foreign Application Priority Data
Jun. 29, 2020   (JP) .................. 2020-111224

(51) Int. Cl.
*G01N 1/34*    (2006.01)
*G01N 1/16*    (2006.01)

(52) U.S. Cl.
CPC ............... *G01N 1/34* (2013.01); *G01N 1/16* (2013.01)

(58) Field of Classification Search
CPC .................................. G01N 1/34; G01N 1/16
(Continued)

(56) References Cited

U.S. PATENT DOCUMENTS

| 3,583,909 A | 6/1971 | Block |
| 2008/0202988 A1* | 8/2008 | Wang .................. B03B 11/00 209/172.5 |
| 2018/0327289 A1 | 11/2018 | Capeau et al. |

FOREIGN PATENT DOCUMENTS

| CN | 108177273 | 6/2018 |
| CN | 109540641 | 3/2019 |

(Continued)

OTHER PUBLICATIONS

International Search Report issued May 25, 2021 in International (PCT) Application No. PCT/JP2021/009167.
(Continued)

*Primary Examiner* — Michael McCullough
*Assistant Examiner* — Jessica L Burkman
(74) *Attorney, Agent, or Firm* — Wenderoth, Lind & Ponack, L.L.P.

(57) ABSTRACT

A sample purification apparatus includes a container for separating, with a heavy solution, a mixed sample based on a specific gravity difference and a collector that collects a component in the mixed sample lighter in specific gravity than the heavy solution by receiving a supernatant flowed out from the container. The container includes a flow-out port provided in an uppermost portion of the container and a flow-out path that guides the supernatant flowed out through the flow-out port to the collector. the container has a horizontal cross-sectional area which gradually decreases upward starting from a prescribed height of the container to a height where the flow-out port is located.

10 Claims, 19 Drawing Sheets

(58) Field of Classification Search
USPC .......................................................... 209/172
See application file for complete search history.

(56) References Cited

FOREIGN PATENT DOCUMENTS

| CN | 109655321 | 4/2019 |
|---|---|---|
| CN | 106801588 | 12/2019 |
| CN | 210427599 | 4/2020 |
| JP | 53-107382 | 2/1977 |
| JP | 2002-336679 | 11/2002 |
| JP | 2003-501673 | 1/2003 |
| WO | 00/76663 | 12/2000 |

OTHER PUBLICATIONS

"Guidelines for the Monitoring and Assessment of Plastic Litter in the Ocean," Gesamp Reports and Studies No. 99, National Oceanic and Atmospheric Administration (NOAA), [Searched on Jun. 17, 2020], the Internet URL: https://environmentlive.unep.org/media/docs/marine_plastics/une_science_dvision_gesamp_reports.pdf.

"Guidelines for Harmonizing Ocean Surface Microplastic Monitoring Methods," Version 1.0, [online], May 2019, Ministry of the Environment, [Searched on Jun. 17, 2020], the Internet URL: http://www.env.go.jp/en/water/marine_litter/guidelines/guidelines.pdf.

Written Opinion of the International Searching Authority issued May 25, 2021 in International (PCT) Application No. PCT/JP2021/009167, with machine translation thereof.

Notice of Reasons for Refusal issued Nov. 7, 2023 in Japanese Patent Application No. 2022-533681, with English-language translation.

Extended European Search Report issued Jun. 3, 2024 in European Application No. 21832547.0.

\* cited by examiner

SAMPLE PURIFICATION APPARATUS AND ANALYSIS SYSTEM

TECHNICAL FIELD

The present disclosure relates to a sample purification apparatus and an analysis system.

BACKGROUND ART

In order to collect a component to be collected, a mixed sample containing the component has conventionally been purified. For example, NPLs 1 and 2 disclose a method of collecting microplastic contained in a mixed sample collected from the sea by purifying the mixed sample.

CITATION LIST

Non Patent Literature

NPL 1: "GUIDELINES FOR THE MONITORING AND ASSESSMENT OF PLASTIC LITTER IN THE OCEAN," GESAMP Reports and Studies No. 99, National Oceanic and Atmospheric Administration (NOAA), [Searched on Jun. 17, 2020], the Internet <URL:https://environmentlive.unep.org/media/docs/marine_plastics/une_science_division_gesamp_reports.pdf>

NPL 2: "Guidelines for Harmonizing Ocean Surface Micro plastic Monitoring Methods," Version 1.0. [online], May 2019, Ministry of the Environment, [Searched on Jun. 17, 2020], the Internet <URL:http://www.env.go.jp/en/water/marine_litter/guidelines/guidelines.pdt>

SUMMARY OF INVENTION

Technical Problem

According to the sample purification method disclosed in NPLs 1 and 2, in purifying a mixed sample, such a work as introduction of a heavy solution for gravity separation of the mixed sample into a container is performed. Further contrivance to accurately collect microplastic from a supernatant produced by introduction of the heavy solution has been demanded.

The present disclosure was made to solve such problems, and an object thereof is to provide a technique to accurately purify a mixed sample.

Solution to Problem

A sample purification apparatus that purifies a mixed sample according to one aspect of the present disclosure includes a container for separating, with a heavy solution, the mixed sample based on a specific gravity difference and a collector that collects a component in the mixed sample lighter in specific gravity than the heavy solution by receiving a supernatant flowed out from the container, the container includes a flow-out port provided in an uppermost portion of the container and a flow-out path that guides the supernatant flowed out through the flow-out port to the collector, and the container has a horizontal cross-sectional area which gradually decreases upward starting from a prescribed height of the container to a height where the flow-out port is located.

An analysis system according to one aspect of the present disclosure includes the sample purification apparatus described above and an analysis apparatus that analyzes a component collected by the collector of the sample purification apparatus.

Advantageous Effects of Invention

According to the present disclosure, the horizontal cross-sectional area of the container is constructed to gradually decrease upward starting from the prescribed height of the container to the height where the flow-out port is located, so that retention in the container, of the component to be collected in flowing out to the outside of the supernatant produced by introduction of the heavy solution can be prevented as much as possible. Therefore, the mixed sample can accurately be purified.

DESCRIPTION OF EMBODIMENTS

Figure 1:
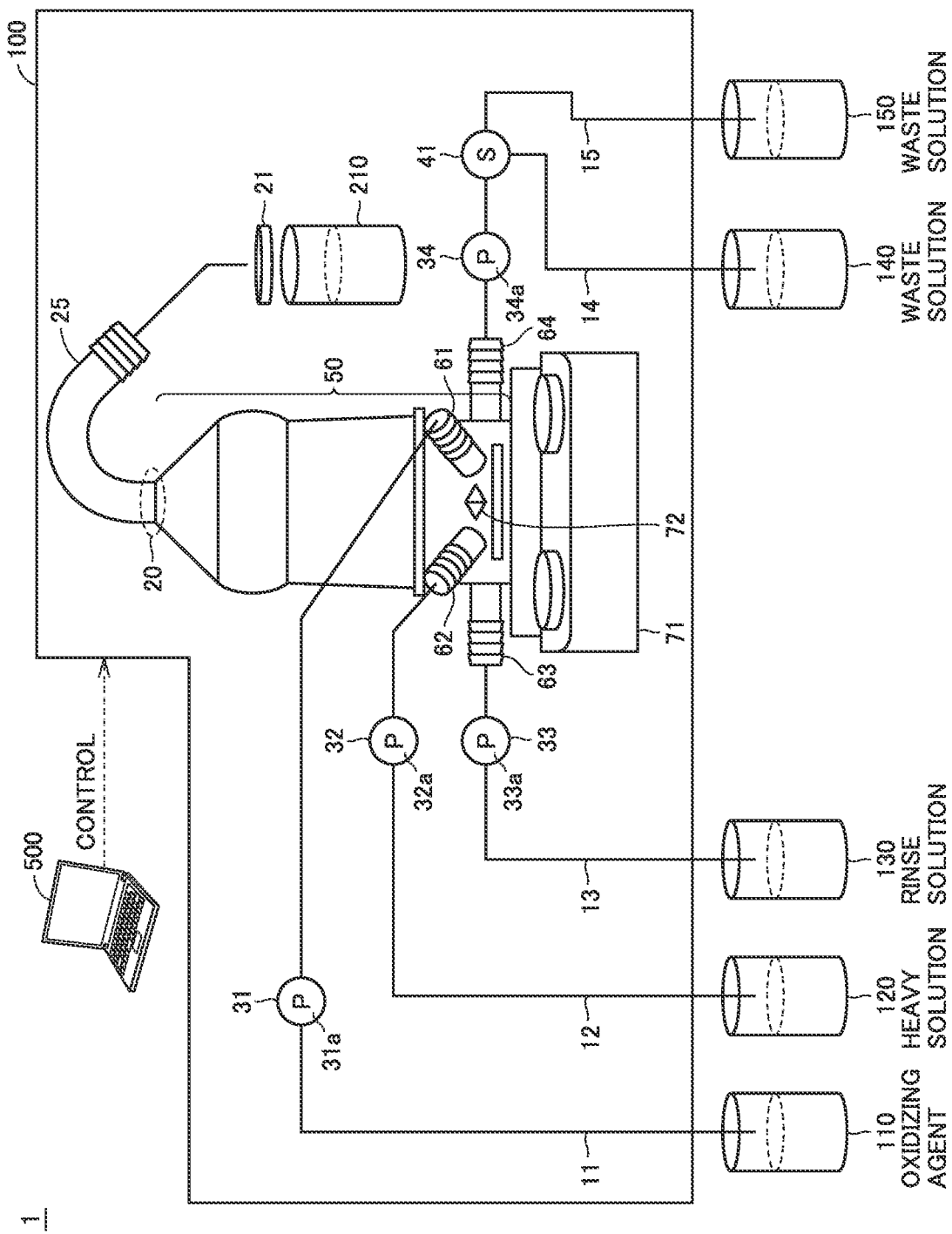
FIG. 1 is a diagram schematically showing a sample purification apparatus according to the present embodiment.

The present embodiment will be described in detail with reference to the drawings. The same or corresponding elements in the drawings have the same reference characters allotted and description thereof will not be repeated in principle.

[Configuration of Sample Purification Apparatus]

FIG. 1 is a diagram schematically showing a sample purification apparatus 1 according to the present embodiment. Sample purification apparatus 1 according to the present embodiment performs processing for collecting, by purifying a mixed sample under the control by a computer 500, a component to be collected that is contained in the mixed sample. "Purification" encompasses purification of a mixture to a pure substance, and in the present embodiment, purification encompasses obtaining a pure substance (component) to be collected from a collected mixed sample.

Any mixed sample may be applicable so long as a "mixed sample" to be purified by sample purification apparatus 1 contains a component to be collected, and exemplary "mixed samples" include seawater and sand collected from the sea or the seashore and processed products such as food and cosmetics. In the present embodiment, seawater and sand collected from the sea or the seashore represent an exemplary "mixed sample." The "mixed sample" is also simply referred to as a "sample" below.

Any component may be applicable so long as the "component" to be collected by sample purification apparatus 1 is collected by sample purification apparatus 1 according to the present embodiment, and exemplary components include microplastic. Microplastic refers, for example, to fine plastic particles each having a length not longer than 5 mm. In the present embodiment, microplastic contained in seawater and sand collected from the sea or the seashore represents an exemplary component.

As shown in FIG. 1, sample purification apparatus 1 includes a sample purification instrument 100 that purifies a sample and computer 500 that controls sample purification instrument 100.

Sample purification instrument 100 includes a container 50 where a sample is accommodated, a plurality of pipes 11 to 15, a plurality of pumps 31 to 34, a plurality of ports 61 to 64, an electromagnetic valve 41, a constant-temperature stirrer 71, a stirring bar 72, a flow-out pipe 25, a detection filter 21, and a container 210.

Pipe 11 represents an exemplary "first pipe." Pipe 11 is connected to a container 110, and through pipe 11, an oxidizing agent for treatment of a contaminant is introduced from container 110 into port 61 provided in container 50. The "contaminant" refers to a foreign matter in the mixed sample, other than a component to be collected. In the present embodiment, an exemplary "contaminant" includes an organic contaminant having a property of an organic substance.

Any oxidizing agent may be applicable so long as the contaminant is treated with the "oxidizing agent." In the present embodiment, the "contaminant" decomposes an organic contaminant. An exemplary "oxidizing agent" includes oxygenated water ($H_2O_2$) and a mixture of oxygenated water ($H_2O_2$) and iron (II) oxide (FeO). When seawater and sand are adopted as the "mixed sample," exemplary "organic contaminants" include a scrap piece of wood mixed in seawater or sand and planktons.

Pipe 12 represents an exemplary "second pipe." Pipe 12 is connected to a container 120, and through pipe 12, a heavy solution for separating a sample based on a specific gravity difference is introduced from container 120 into port 62 provided in container 50.

Any heavy solution may be applicable so long as the "heavy solution" separates the sample based on the specific gravity difference. In the present embodiment, the "heavy solution" allows an inorganic contaminant having a property of an inorganic substance to settle based on the specific gravity difference. Exemplary "heavy solutions" include sodium chloride (NaCl), sodium iodide (NaI), and zinc chloride ($ZnCl_2$). When seawater and sand are adopted as the "mixed sample," exemplary "inorganic contaminants" include sand, glass, and stone. A specific gravity of the "heavy solution" is set to be greater than a specific gravity of the "component" to be collected by sample purification apparatus 1 and to be smaller than a specific gravity of the "inorganic contaminant." For example, when microplastic is adopted as the "component" to be collected by sample purification apparatus 1 and sand, glass, stone, and the like are adopted as the "inorganic contaminant," the "heavy solution" should only be greater in specific gravity than microplastic and should only be smaller in specific gravity than sand, glass, stone, and the like. Specifically, the specific gravity of the "heavy solution" should only be set approximately to 1.5 to 1.7.

Pipe 13 represents an exemplary "fourth pipe." Pipe 13 is connected to a container 130, and through pipe 13, a rinse solution for cleaning of the inside of container 50 is introduced from container 130 into port 63 provided in container 50.

Any rinse solution may be applicable so long as the inside of container 50 is cleaned with the "rinse solution," and an exemplary "rinse solution" includes water.

Pipe 14 and pipe 15 represent an exemplary "third pipe." Pipe 14 is connected to a container 140, and through pipe 14, a waste solution in container 50 is discharged through port 64 provided in container 50 into container 140. Pipe 15 is connected to a container ISO, and through pipe 15, the waste solution in container 50 is discharged through port 64 provided in container 50 into container 150.

Pump 31 is provided between pipe 11 and container 50, and as valve 31a operates under the control by computer 500, pump 31 suctions the oxidizing agent accommodated in container 110 and introduces the oxidizing agent toward port 61. Pump 32 is provided between pipe 12 and container 50, and as valve 32a operates under the control by computer 500, pump 32 suctions the heavy solution accommodated in container 120 and introduces the heavy solution toward port 62. Pump 33 is provided between pipe 13 and container 50, and as valve 33a operates under the control by computer 500, pump 33 suctions the rinse solution accommodated in container 130 and introduces the rinse solution toward port 63. Pump 34 is provided between each of pipes 14 and 15 and container 50, and as valve 34a operates under the control by computer 500, pump 34 suctions the waste solution in container 50 and discharges the waste solution through port 64 toward container 140 or 150. Each of valves 31a to 34a represents an exemplary "switching unit" and switches between entry and exit of a solution by opening and closing of a passage provided in each of pumps 31 to 34.

Any switching unit may be applicable so long as the "switching unit" switches between entry and exit of a solution in each of pipes 11 to 15. For example, the "switching unit" may allow suction and delivery by reciprocating motion of a piston or the like or by rotary motion of a gear or the like. The "solution" includes the oxidizing agent, the heavy solution, the rinse solution, the waste solution, and the like.

Ports 61 and 64 serve as an inlet and an outlet for entry and exit of a solution provided in an outer circumferential portion of container 50. In the inside of each of ports 61 to 64, a filter (for example, a filter 163 or 164 shown in FIG. 16 which will be described later) is provided so as not to allow discharge of a component contained in a sample to the outside.

Electromagnetic valve 41 is provided between each of pipes 14 and 15 and pump 34, and as electromagnetic valve 41 operates under the control by computer 500, electromagnetic valve 41 switches a path through which the waste solution passes between a path between pipe 14 and pump 34 and a path between pipe IS and pump 34.

Constant-temperature stirrer 71 represents an exemplary "stirring unit" and an exemplary "heating unit." Container 50 is carried on constant-temperature stirrer 71. Constant-temperature stirrer 71 stirs a sample accommodated in container 50 by rotation of a stirring bar 72 provided in container 50 under the control by computer 500. Furthermore, constant-temperature stirrer 71 applies heat to container 50 to keep the temperature of the sample accommodated in container 50 constant.

Flow-out pipe 25 is connected to a flow-out port 20 provided at an uppermost portion of container 50, and through flow-out pipe 25, a supernatant of the sample that overflows container 50 is flowed out to the outside. Flow-out port 20 represents an exemplary "flow-out portion." Flow-out pipe 25 represents an exemplary "flow-out path." Detection filter 21 collects, by filtering the supernatant of the sample flowed out through flow-out pipe 25, a component to be collected that is contained in the supernatant. The supernatant that has passed through detection filter 21 is collected in container 210. In a preferred embodiment, detection filter 21 is a filter capable of trapping microplastic to be collected. A specific example of the filter includes a wire gauze made of SUS (stainless steel) or a membrane filter made of PTFE (made of Teflon™). Detection filter 21 represents an exemplary "collector."

Computer 500 may be implemented by a general-purpose computer or a dedicated computer for controlling sample purification instrument 100. Computer 500 controls each of valves 31a to 34a, electromagnetic valve 41, and constant-temperature stirrer 71 in sample purification instrument 100.

Specifically, computer 500 has electric power provided to a motor (not shown) in each of valves 31a to 34a to drive the motor. Drive force from the motor opens and closes valves 31a to 34a so that pumps 31 to 34 suction and deliver a solution.

Computer 500 has a current flow to a solenoid (not shown) of electromagnetic valve 41 to open and close a valve (not shown) to thereby switch between paths through which the waste solution passes.

Furthermore, computer 500 has electric power provided to a motor (not shown) of constant-temperature stirrer 71 to drive the motor. Drive force from the motor rotates stirring bar 72 to thereby stir the sample accommodated in container 50. In addition, computer 500 has electric power provided to a heater (not shown) of constant-temperature stirrer 71 to apply certain heat to container 50.

Figure 2:
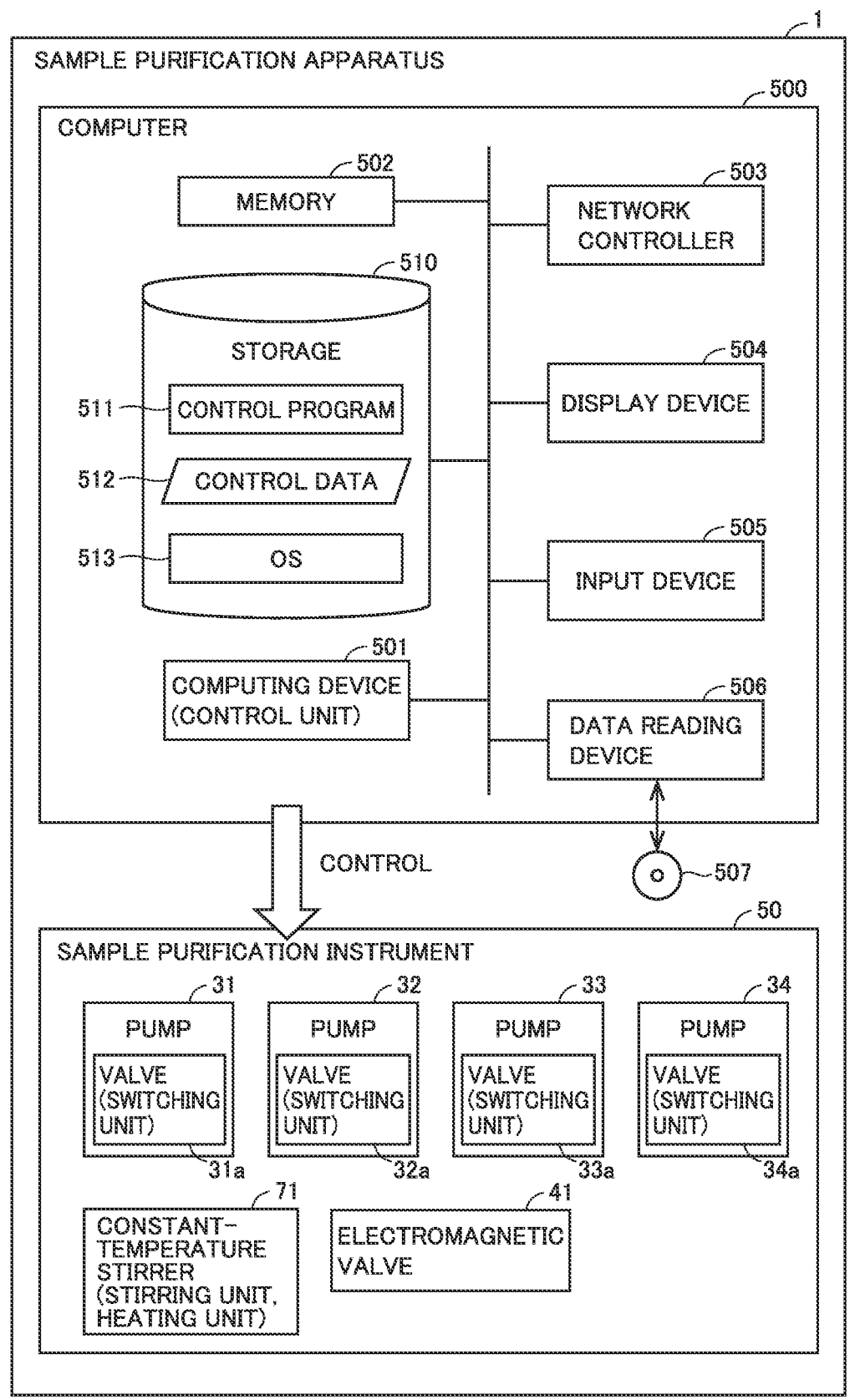
FIG. 2 is a diagram schematically showing an internal configuration of the sample purification apparatus according to the present embodiment.

FIG. 2 is a diagram schematically showing an internal configuration of sample purification apparatus 1 according to the present embodiment. As shown in FIG. 2, computer 500 includes, as main hardware elements thereof, a computing device 501, a memory 502, a network controller 503, a display device 504, an input device 505, a data reading device 506, and a storage 510.

Computing device 501 represents an exemplary "control unit." Computing device 501 is a processing entity that performs various types of processing by executing various programs. For example, computing device 501 performs sample purification processing (which will be described later with reference to FIG. 14) for controlling each of valves 31a to 34a, electromagnetic valve 41, and constant-temperature stirrer 71 in sample purification instrument 100 by executing a control program 511 which will be described later.

Computing device 501 is implemented, for example, by a central processing unit (CPU), a field programmable gate array (FPGA), a graphics processing unit (GPU), and the like. Computing device 501 may be implemented by processing circuitry that performs computing.

Though computing device 501 included in computer 500 is provided as an exemplary "control unit" in the present embodiment, the "control unit" may be a controller such as a programmable logic controller (PLC) that subjects each feature to sequence control in accordance with a program created by a user. Furthermore, though the "control unit" is separate from sample purification instrument 100 in the present embodiment, the "control unit" may be integrated with sample purification instrument 100. For example, sample purification instrument 100 may contain a device corresponding to computing device 501.

Memory 502 provides a storage area where a program code or a work memory is temporarily stored in execution of any program by computing device 501. Memory 502 is implemented, for example, by a volatile memory device such as a dynamic random access memory (DRAM) or a static random access memory (SRAM).

Network controller 503 carries out transmission and reception to and from another device over a network (not shown). Network controller 503 is in conformity with any communication scheme such as Ethernet®, wireless local area network (LAN), and Bluetooth®.

Display device 504 is implemented, for example, by a liquid crystal display (LCD), and shows a program design screen or an alert screen on the occurrence of an abnormal condition.

Input device 505 is implemented, for example, by a keyboard, a mouse, and the like, and used for input of design information by a user in design of a program. Input device 505 may be implemented by a start switch for starting sample purification processing by computing device 501.

Data reading device 506 is a device for reading data stored in a storage medium 507. Any storage medium such as a compact disc (CD), a digital versatile disc (DVD), and a universal serial bus (USB) memory may be applicable so long as various types of data can be stored in storage medium 507.

Storage 510 provides a storage area where various types of data required for sample purification processing or the like are stored. Storage 510 is implemented, for example, by a non-volatile memory device such as a hard disk or a solid state drive (SSD). Control program 511, control data 512, and an operating system (OS) 513 are stored in storage 510.

Control program 511 is a program in which contents of sample purification processing are described, and executed by computing device 501. Control program 511 may be designed by a user with the use of input device 505, read from storage medium 507 by data reading device 506, or obtained through the network from another device such as a server by network controller 503.

Control data 512 is data used in execution of control program 511 by computing device 501. For example, control data 512 includes data for controlling each of valves 31a to 34a, electromagnetic valve 41, and constant-temperature stirrer 71. Control data 512 may be inputted by a user with the use of input device 505, read from storage medium 507 by data reading device 506, or obtained through the network from another device such as a server by network controller 503.

OS 513 provides a basic function for computing device 501 to perform various types of processing.

[Sample Purification Method]

A sample purification method with the use of sample purification apparatus 1 will be described with reference to FIGS. 3 to 13. FIGS. 3 to 13 are diagrams for illustrating the sample purification method with the use of sample purification apparatus 1 according to the present embodiment.

For prior preparation, a user such as a worker prepares container 110, container 120, container 130, container 140, container 150, container 210, and detection filter 21. The user places the oxidizing agent in container 110 and inserts pipe 11 into container 110. The user places the heavy solution in container 120 and inserts pipe 12 into container 120. The user places the rinse solution in container 130 and inserts pipe 13 into container 130. The user inserts pipe 14 into container 140 and inserts pipe 15 into container 150. At this stage, each of containers 140 and 150 is empty. The user arranges detection filter 21 and container 210 around an outlet of flow-out pipe 25 in this order from a side of flow-out pipe 25.

Figure 3:
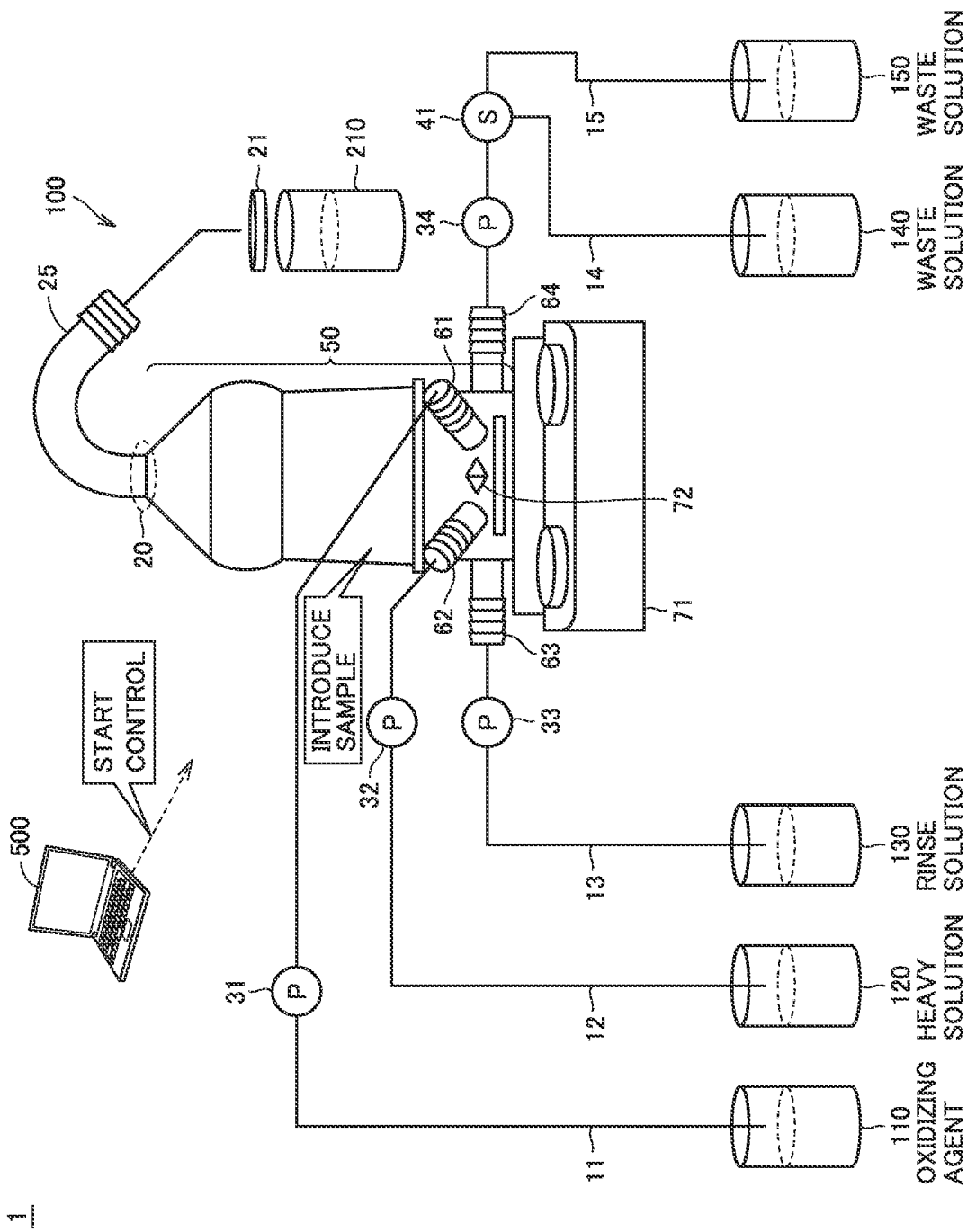
FIG. 3 is a diagram for illustrating a sample purification method with the use of the sample purification apparatus according to the present embodiment.

As shown in FIG. 3, the user introduces the sample (mixed sample) into container 50 of sample purification apparatus 1. For example, the user separates a part of container 50 constituted of a plurality of members to open container 50 and feeds the sample into container 50. Thereafter, the user performs a start operation with the use of input device 505 of computer 500 to start control of sample purification instrument 100 by computer 500.

Figure 4:
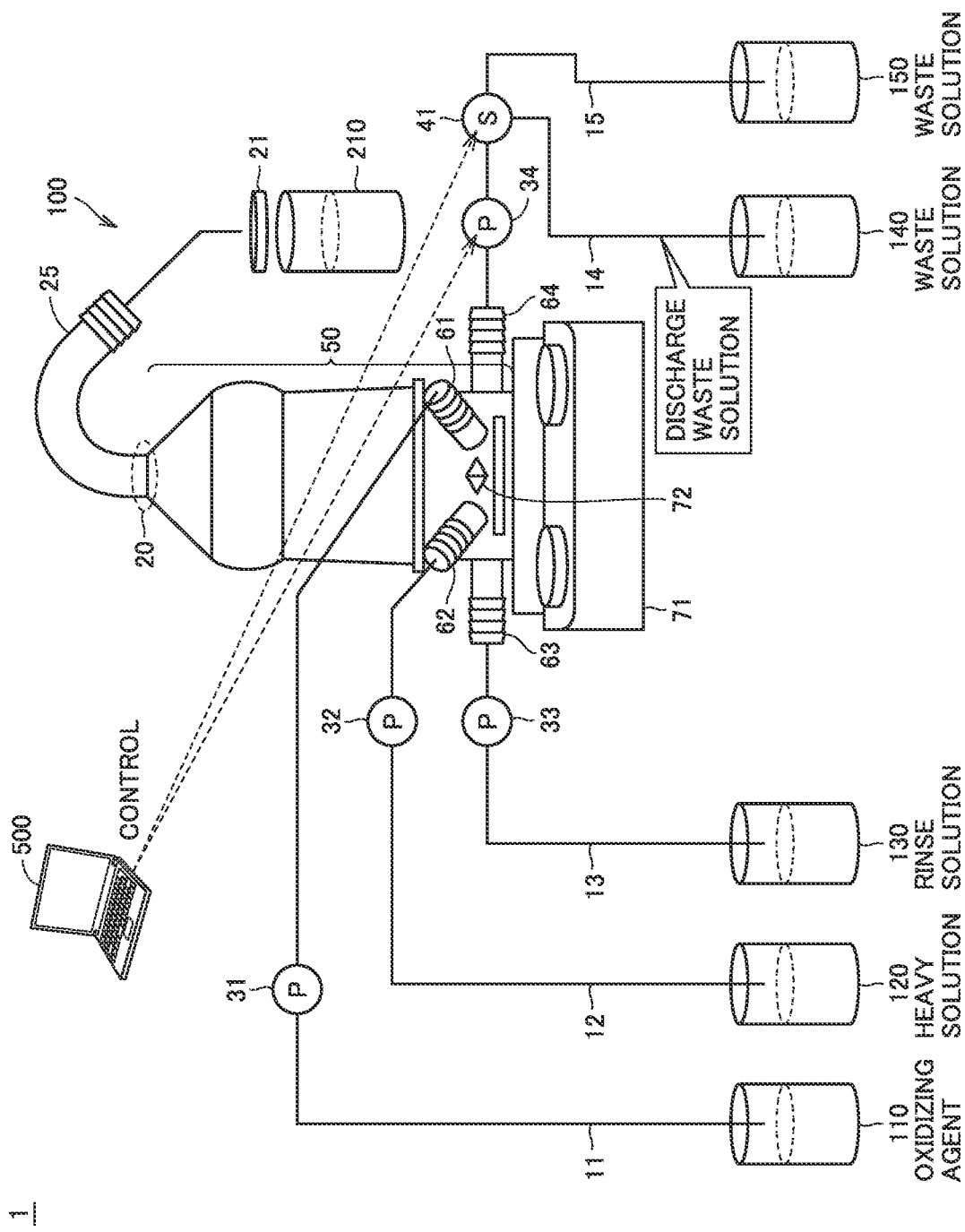
FIG. 4 is a diagram for illustrating the sample purification method with the use of the sample purification apparatus according to the present embodiment.

As control by computer 500 is started, as shown in FIG. 4, computer 500 controls valve 34a and electromagnetic valve 41 to discharge the waste solution in container 50 to container 140 through port 64 and pipe 14. The sample accommodated in container 50 contains the waste solution such as seawater, and such waste solution is discharged to container 140. Microplastic to be collected that is contained in the sample, on the other hand, is not discharged to the outside owing to filter 164 (see FIG. 16) included in port 64 but remains in container 50.

Figure 5:
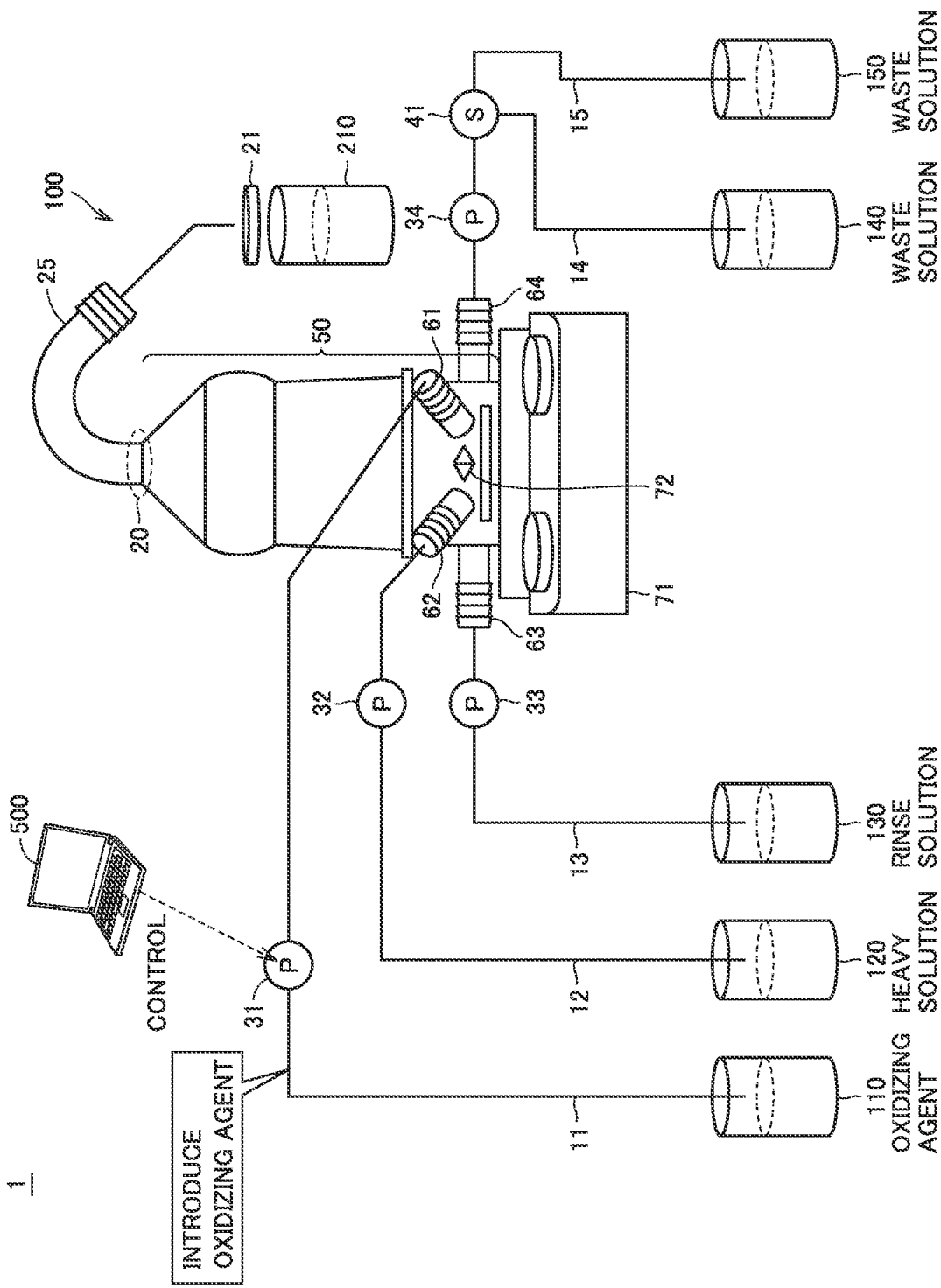
FIG. 5 is a diagram for illustrating the sample purification method with the use of the sample purification apparatus according to the present embodiment.

Then, as shown in FIG. 5, computer 500 controls valve 31a to introduce the oxidizing agent accommodated in container 110 into container 50 through pipe 11 and port 61. At this time, computer 500 controls an amount of suction by pump 31 to introduce the oxidizing agent in an amount set in advance by the user into container 50. For example, computer 500 adjusts opening of valve 31a of pump 31 to control the amount of suction by pump 31. Alternatively, computer 500 may control the amount of suction by pump 31 based on a detection value of a liquid level sensor provided in container 110 or container 50.

Figure 6:
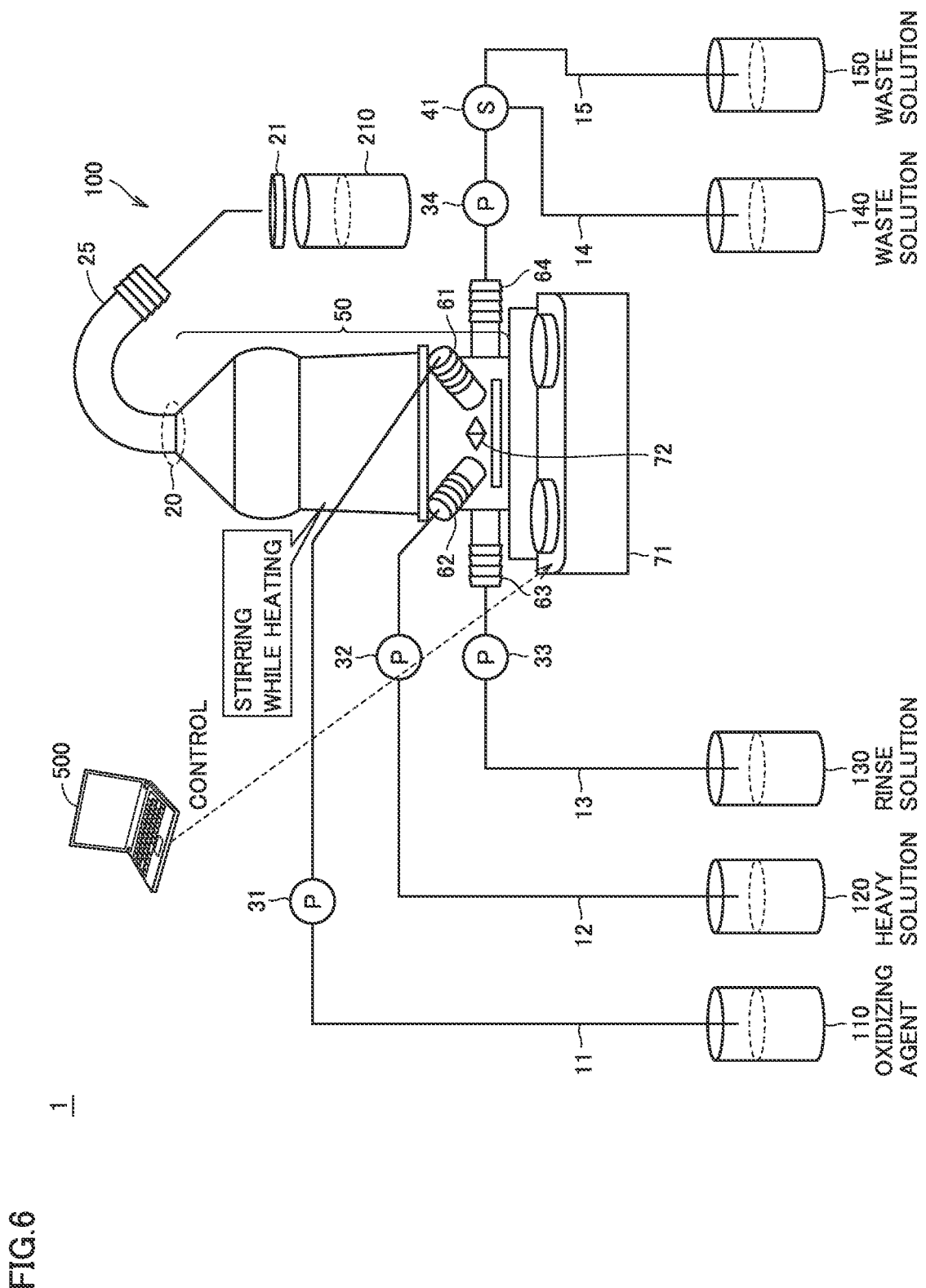
FIG. 6 is a diagram for illustrating the sample purification method with the use of the sample purification apparatus according to the present embodiment.

Then, as shown in FIG. 6, computer 500 controls constant-temperature stirrer 71 to rotate stirring bar 72 provided in container 50 while certain heat is applied to container 50. A temperature of container 50 and a rotation speed and a time period of rotation of stirring bar 72 are set in advance by the user. For example, computer 500 controls constant-temperature stirrer 71 to stir the sample accommodated in container 50 for approximately three days while container 50 is kept at a temperature around 75 degrees. As the sample is thus stirred, oxidation treatment with the oxidizing agent is performed and an organic contaminant contained in the sample is decomposed. Though heating is not necessarily required in stirring of the sample, decomposition by oxidation treatment tends to be expedited by heating to keep the temperature of the sample constant.

Figure 7:
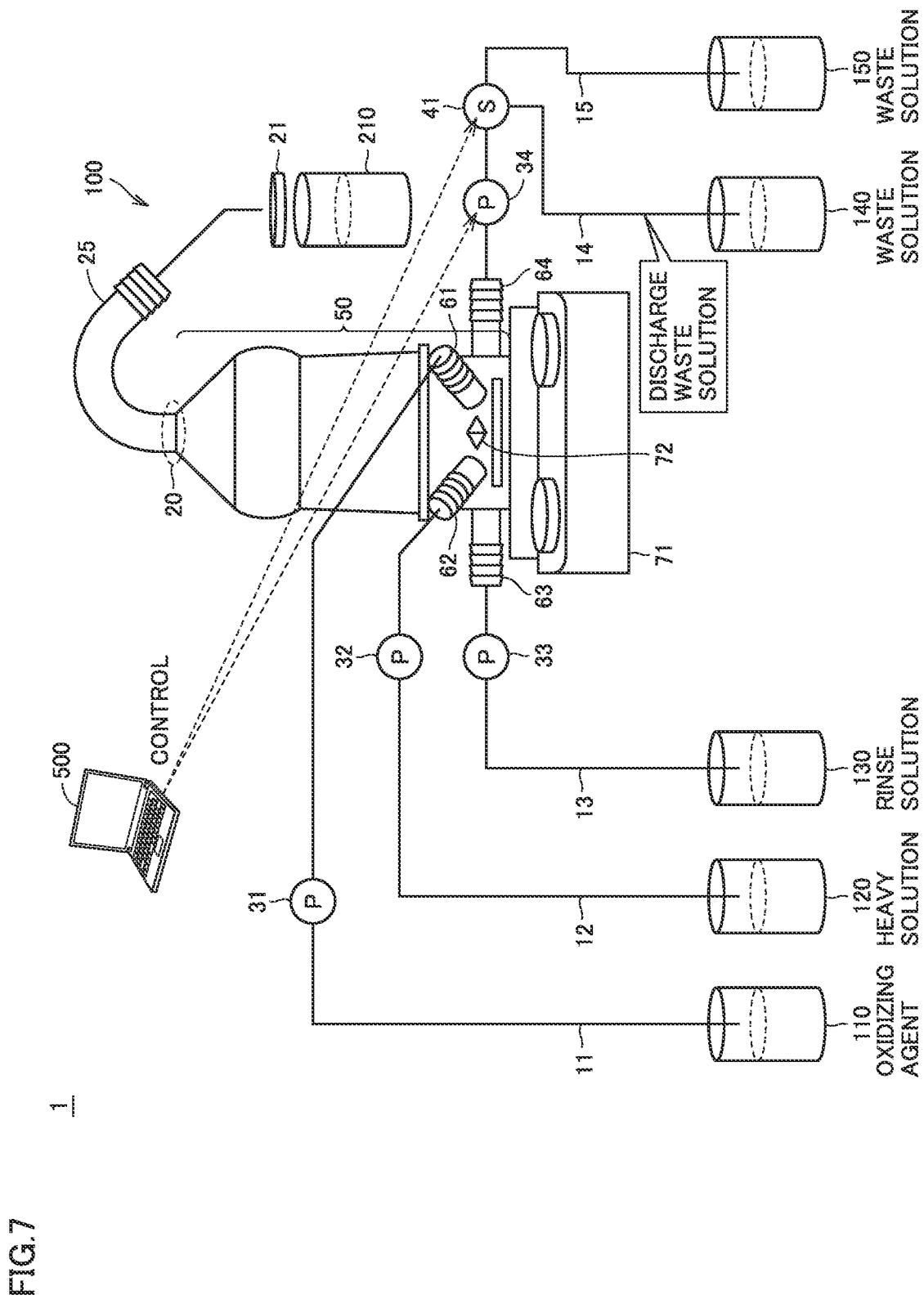
FIG. 7 is a diagram for illustrating the sample purification method with the use of the sample purification apparatus according to the present embodiment.

Then, as shown in FIG. 7, computer 500 controls valve 34a and electromagnetic valve 41 to discharge to container 140 through port 64 and pipe 14, the waste solution in container 50 contained in the sample where the organic contaminant has been decomposed. Microplastic to be collected that is contained in the sample, on the other hand, is not discharged to the outside owing to filter 164 included in port 64 but remains in container 50.

Figure 8:
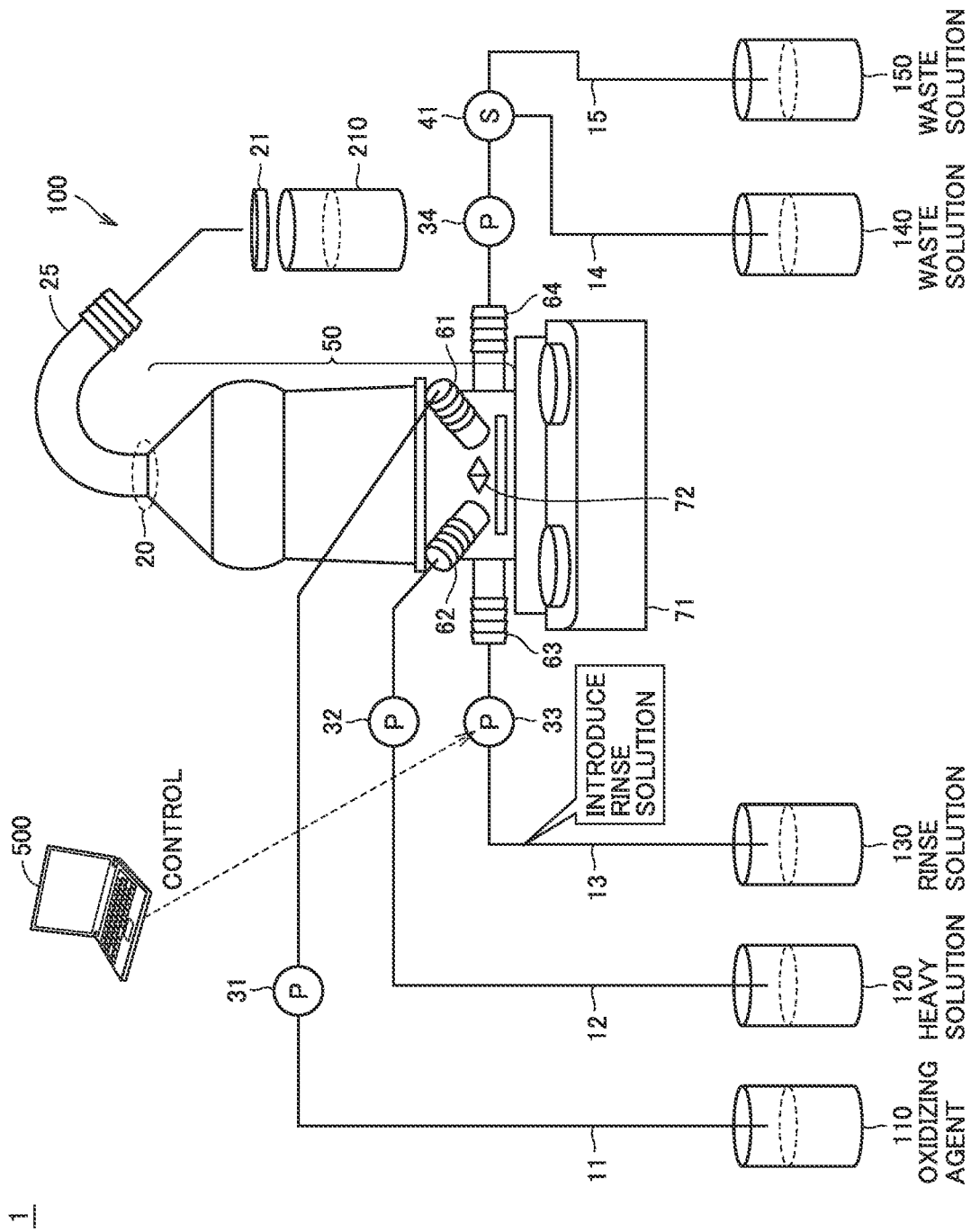
FIG. 8 is a diagram for illustrating the sample purification method with the use of the sample purification apparatus according to the present embodiment.

Then, as shown in FIG. 8, computer 500 controls pump 33 to introduce the rinse solution accommodated in container 130 into container 50 through pipe 13 and port 63. At this time, computer 500 controls an amount of suction by pump 33 to introduce the rinse solution in an amount set in advance by the user into container 50. For example, computer 500 adjusts opening of valve 33a to control the amount of suction by pump 33. Alternatively, computer 500 may control the amount of suction by pump 33 based on a detection value from a liquid level sensor provided in container 130 or container 50.

Figure 9:
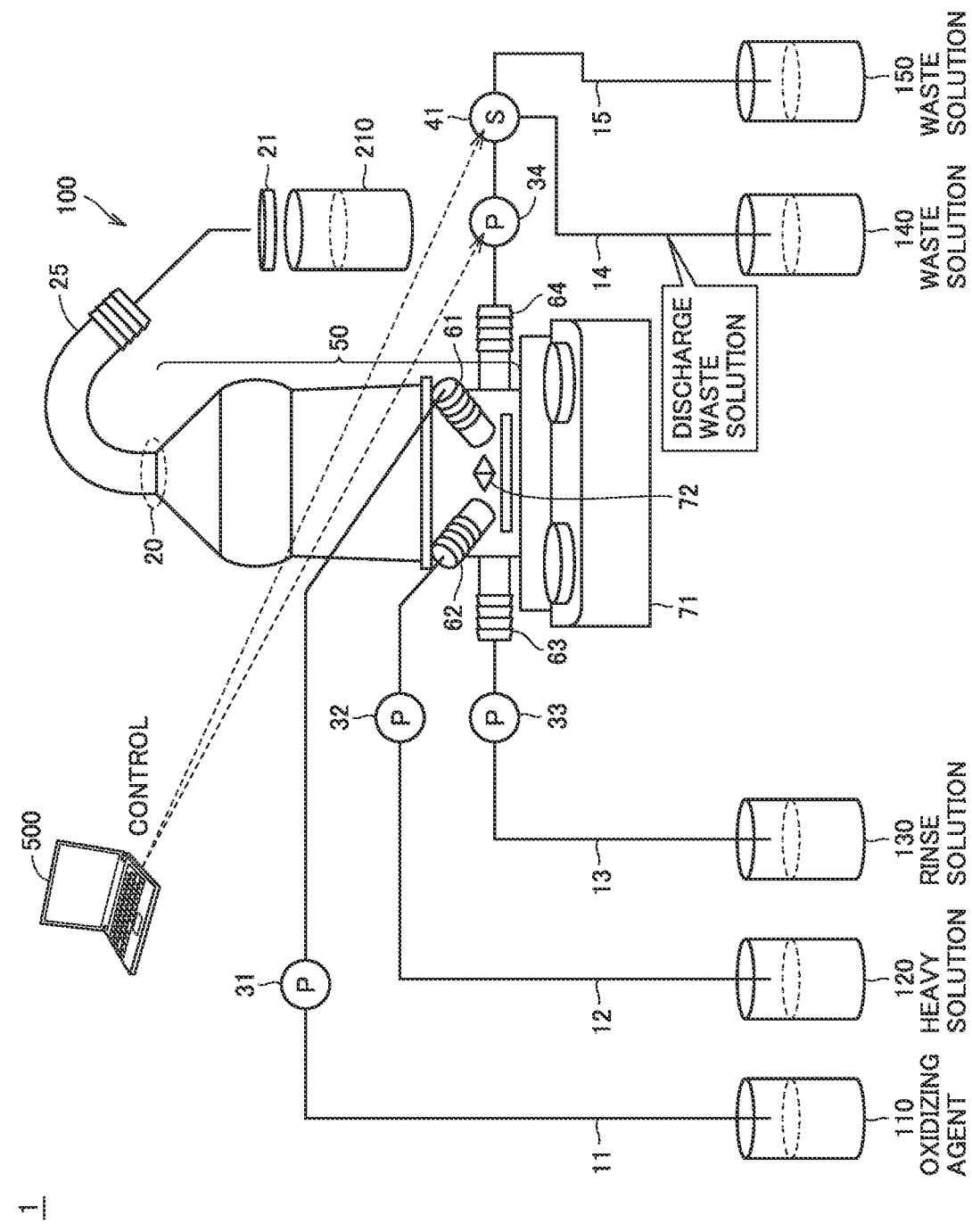
FIG. 9 is a diagram for illustrating the sample purification method with the use of the sample purification apparatus according to the present embodiment.

Then, as shown in FIG. 9, computer 500 controls valve 34a and electromagnetic valve 41 to discharge through port 64 and pipe 14 to container 140, the waste solution in container 50 into which the rinse solution has been introduced. The inside of container 50 is thus cleaned with the rinse solution. Microplastic to be collected that is contained in the sample, on the other hand, is not discharged to the outside owing to filter 164 included in port 64 but remains in container 50.

Figure 10:
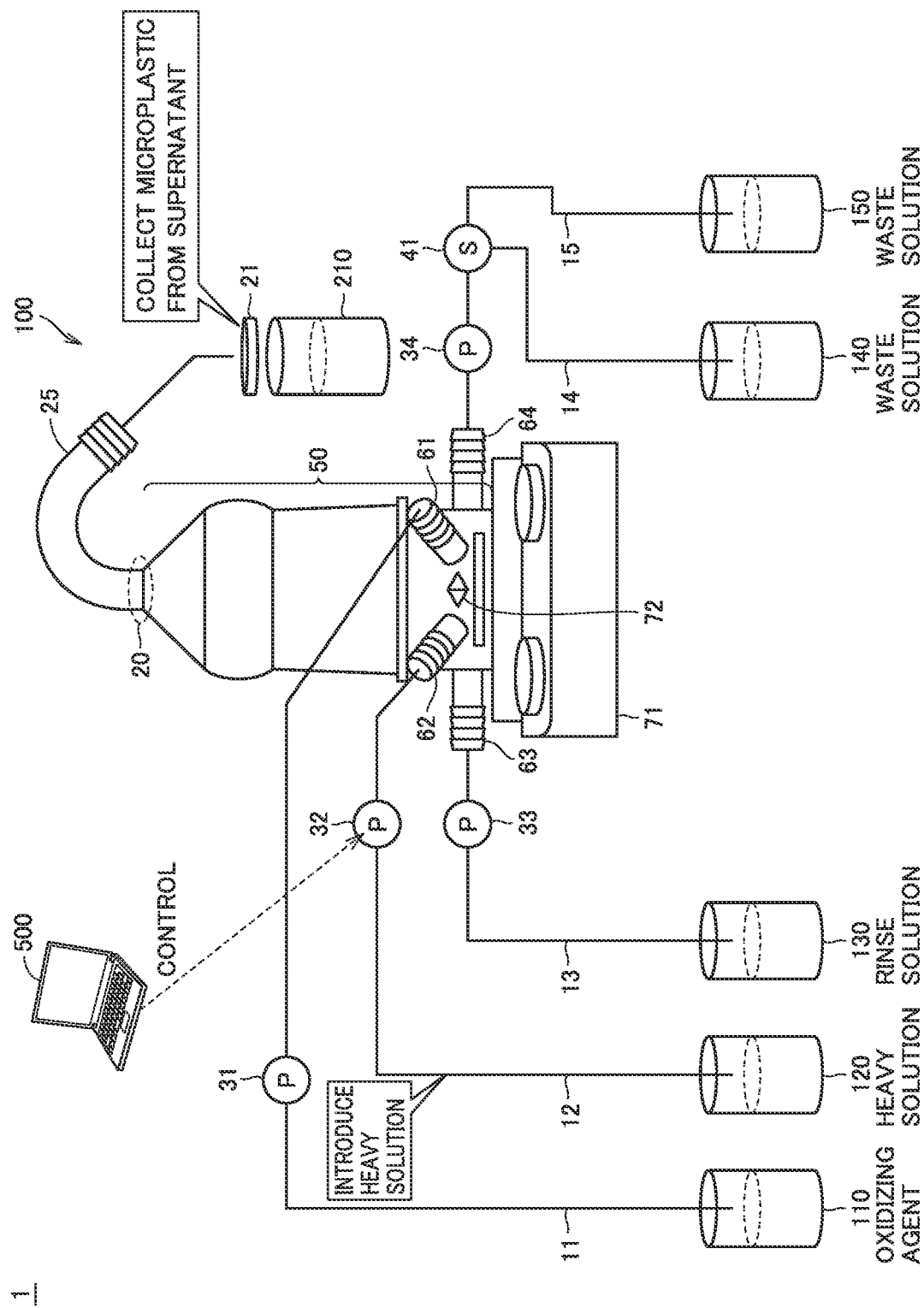
FIG. 10 is a diagram for illustrating the sample purification method with the use of the sample purification apparatus according to the present embodiment.

Thereafter, computer 500 has the sample left as it is for a prescribed time period (for example, for one day) to dry the sample. Then, as shown in FIG. 10, computer 500 controls valve 32a to introduce the heavy solution accommodated in container 120 into container 50 through pipe 12 and port 62. At this time, computer 500 controls an amount of suction by pump 32 to introduce the heavy solution in an amount set in advance by the user into container 50. For example, computer 500 adjusts opening of valve 32a to control the amount of suction by pump 32. Alternatively, computer 500 may control the amount of suction by pump 32 based on a detection value from a liquid level sensor provided in container 120 or container 50.

As the heavy solution is thus introduced to the sample, an inorganic contaminant contained in the sample settles around the bottom of container 50 owing to a specific gravity difference. The liquid level of the sample separated by gravity gradually rises in container 50 and the supernatant of the sample soon reaches flow-out port 20 of container 50. Then, the supernatant of the sample is flowed out to the outside through flow-out port 20 and flow-out pipe 25. The supernatant of the sample flowed out through flow-out pipe 25 is filtered by detection filter 21, and only the waste solution is collected in container 210. Microplastic which is a component lighter in specific gravity than the heavy solution remains at detection filter 21. Such gravity separation requires approximately one day, and hence computer 500 controls introduction of the heavy solution to the sample during that period.

As set forth above, sample purification apparatus 1 according to the present embodiment can purify the sample through successive works with the use of a single container 50. Specifically, as shown in FIGS. 3 to 10, computer 500 controls sample purification instrument 100 to automatically introduce the oxidizing agent and the heavy solution to the sample accommodated in container 50 at appropriate timing for an appropriate period of time and to discharge the waste solution from container 50. Therefore, the user himself/ herself does not have to introduce the oxidizing agent and the heavy solution into container 50 and to discharge the waste solution from container 50. Thus, time and efforts of the user are not required or variation in accuracy in collection of a component depending on skills of each user is unlikely, and the user can accurately purify the sample with time and efforts being minimized.

Figure 11:
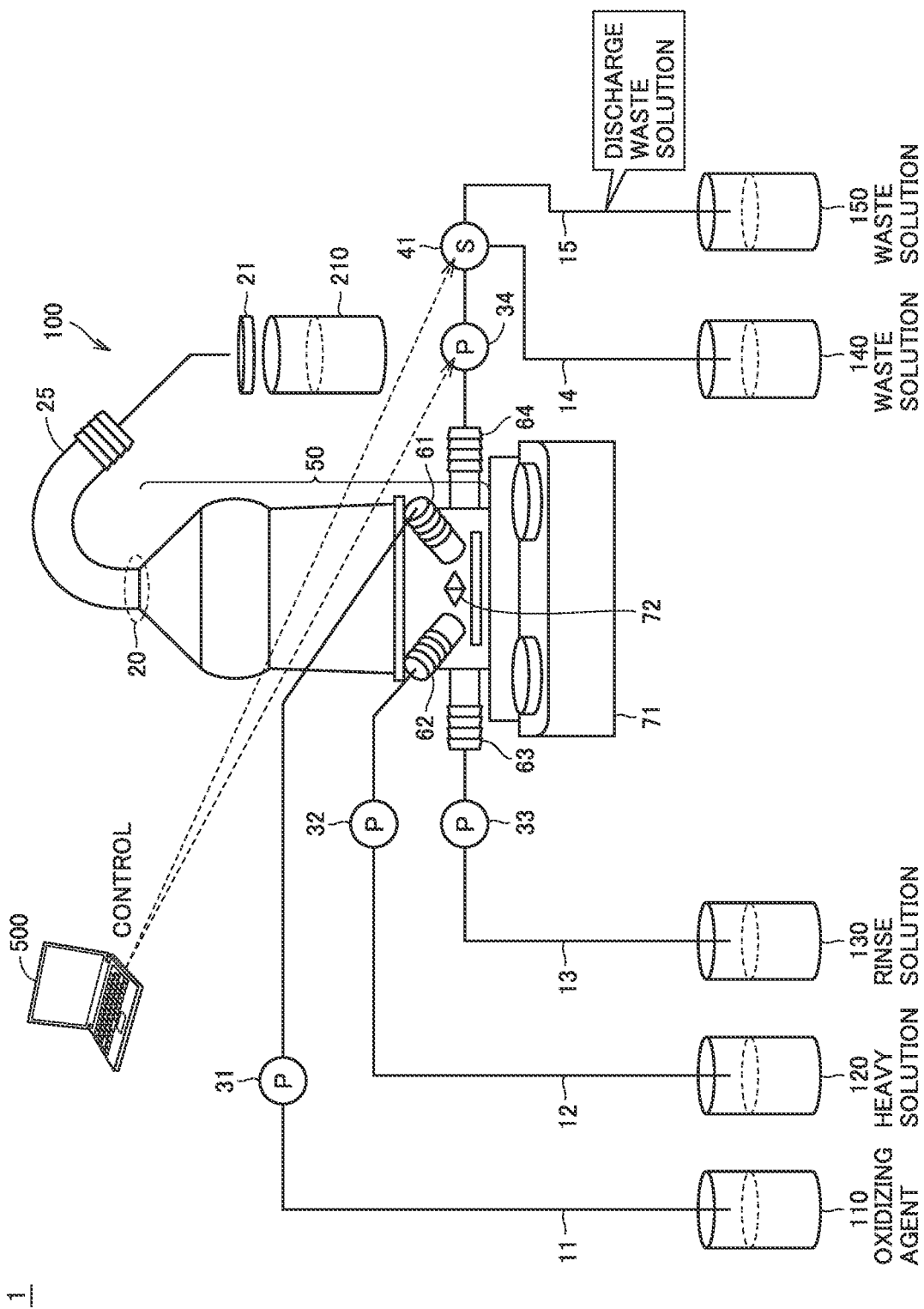
FIG. 11 is a diagram for illustrating the sample purification method with the use of the sample purification apparatus according to the present embodiment.

After microplastic is collected by purification of the sample, container 50 is cleaned in post-treatment. Specifically, as shown in FIG. 11, computer 500 controls valve 34*a* and electromagnetic valve 41 to discharge the waste solution in container 50 from which microplastic has been collected to container 150 through port 64 and pipe 15.

Figure 12:
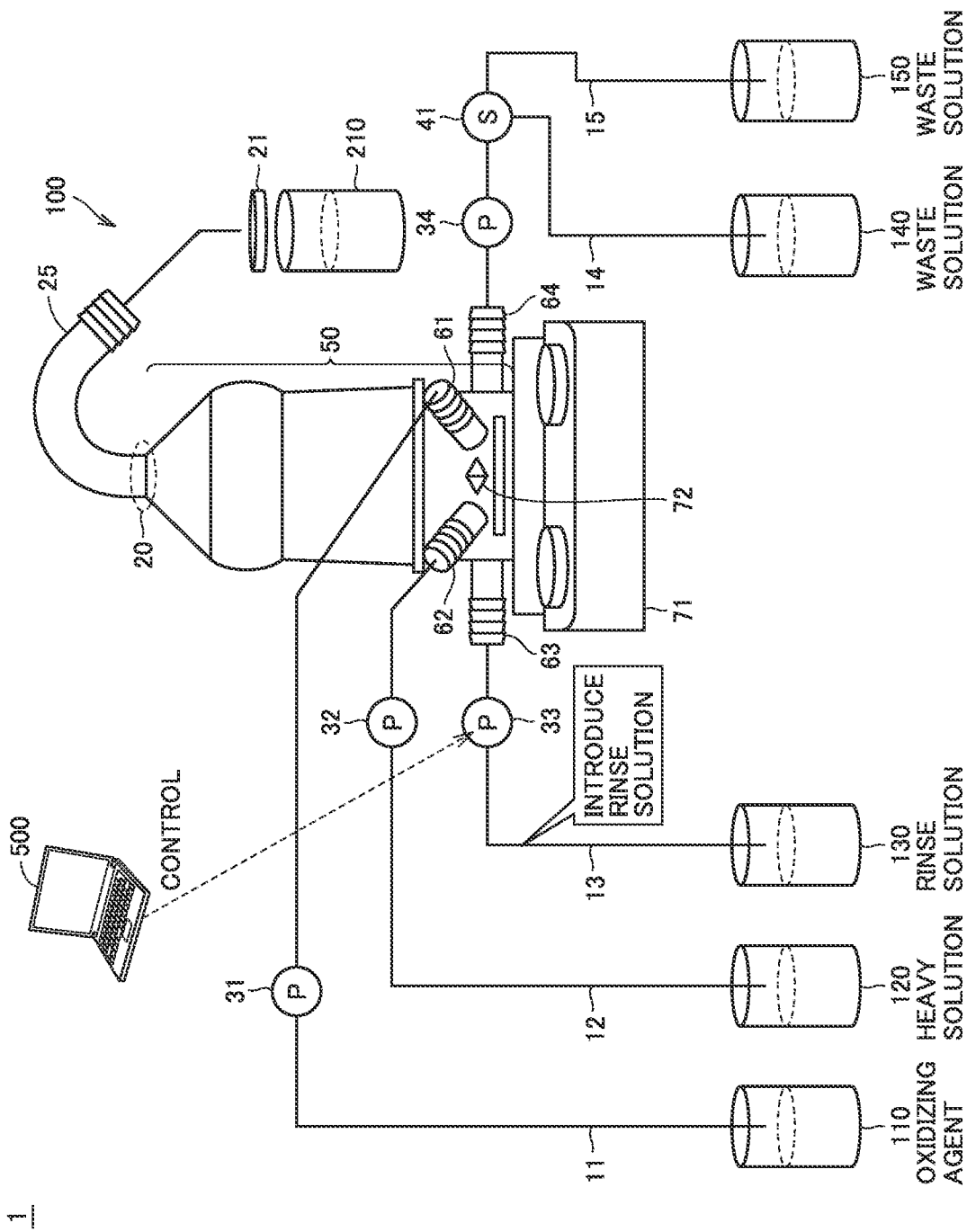
FIG. 12 is a diagram for illustrating the sample purification method with the use of the sample purification apparatus according to the present embodiment.

Then, as shown in FIG. 12, computer 500 controls valve 33*a* to introduce the rinse solution accommodated in container 130 into container 50 through pipe 13 and port 63. At this time, computer 500 controls the amount of suction by pump 33 to introduce the rinse solution in an amount set in advance by the user into container 50. For example, computer 500 adjusts opening of valve 33*a* to control the amount of suction by pump 33. Alternatively, computer 500 may control the amount of suction by pump 33 based on a detection value from the liquid level sensor provided in container 130 or container 50.

Figure 13:
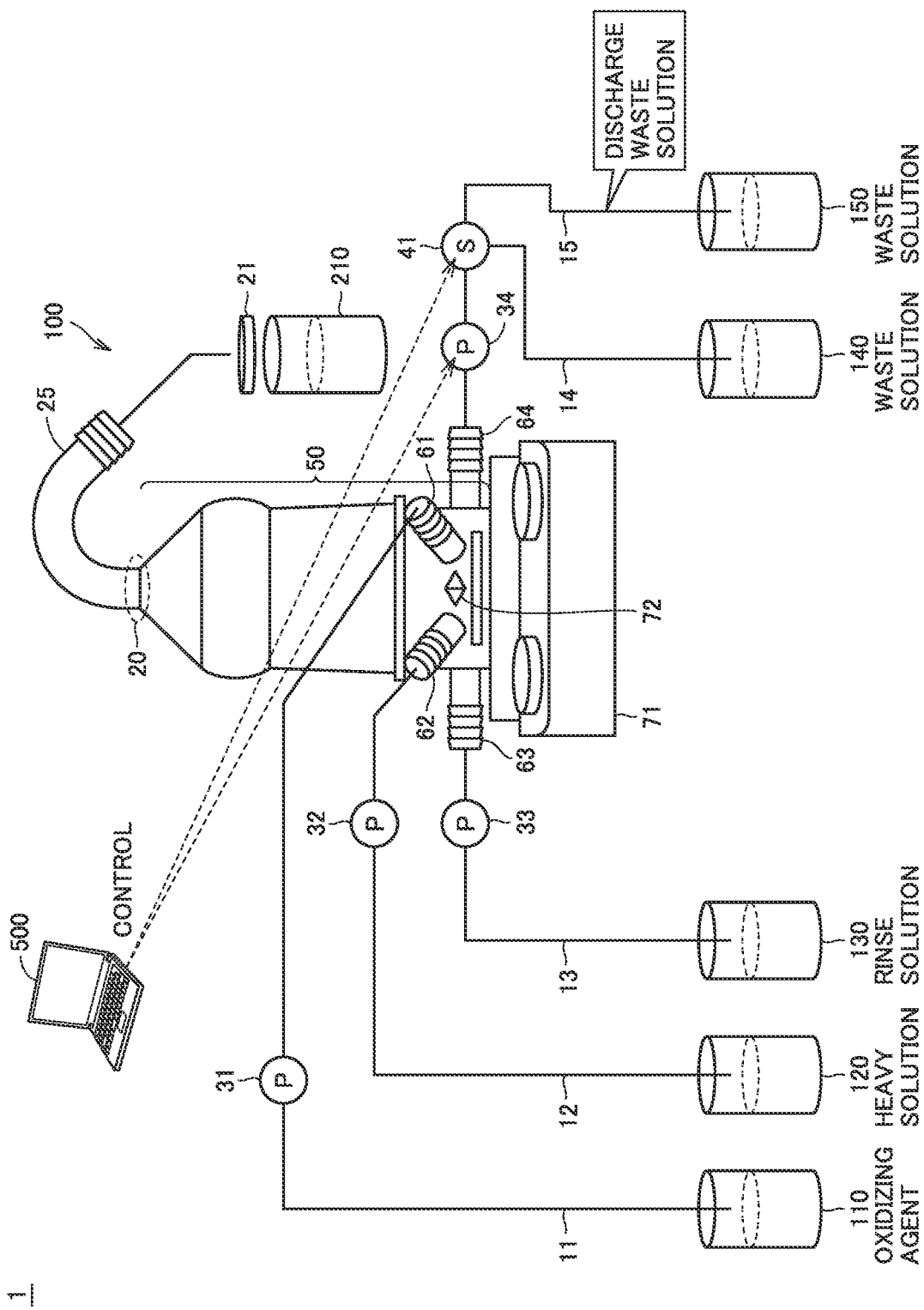
FIG. 13 is a diagram for illustrating the sample purification method with the use of the sample purification apparatus according to the present embodiment.

Then, as shown in FIG. 13, computer 500 controls valve 34*a* and electromagnetic valve 41 to discharge to container 150 through port 64 and pipe 15, the waste solution in container 50 into which the rinse solution has been introduced. The inside of container 50 is thus cleaned with the rinse solution.

As set forth above, according to sample purification apparatus 1 according to the present embodiment, after microplastic is collected, computer 500 controls sample purification instrument 100 to automatically clean used container 50. Therefore, the user himself/herself does not have to clean container 50 so that time and efforts are minimized.

[Sample Purification Processing]

Figure 14:
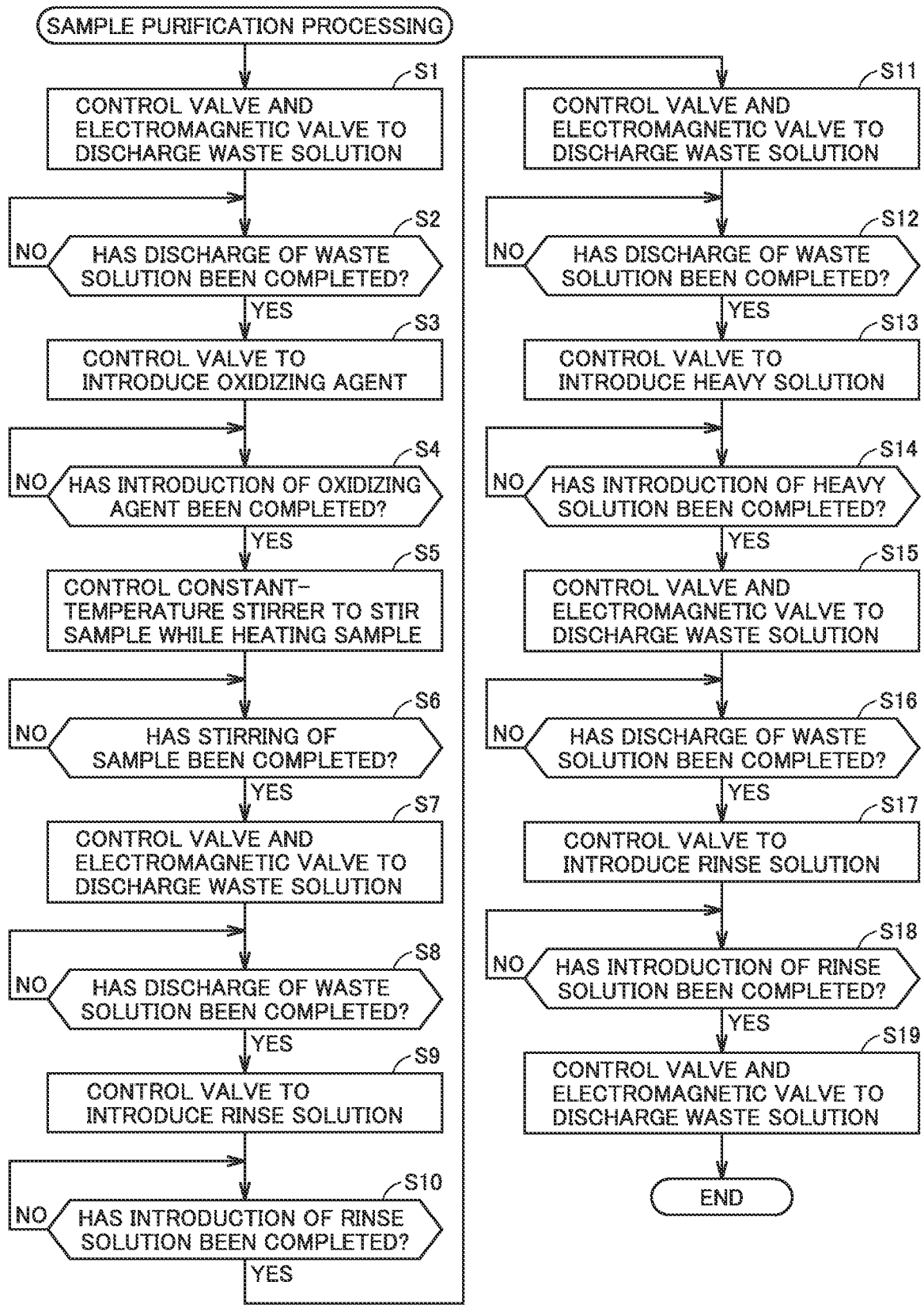
FIG. 14 is a flowchart for illustrating sample purification processing performed by the sample purification apparatus according to the present embodiment.

FIG. 14 is a flowchart for illustrating sample purification processing performed by sample purification apparatus 1 according to the present embodiment. Each step shown in FIG. 14 is performed by execution of OS 513 and control program 511 by computing device 501 of computer 500. "S" in the drawings is used as abbreviation of "STEP".

When computer 500 receives a start operation through input device 505 while the sample is located in container 50 of sample purification apparatus 1, computer 500 performs sample purification processing shown in FIG. 14. As shown in FIG. 14, computer 500 initially controls valve 34*a* and electromagnetic valve 41 to discharge the waste solution in container 50 to container 140 (S1).

Then, computer 500 determines whether or not discharge of the waste solution has been completed (S2). For example, computer 500 determines whether or not discharge of the waste solution has been completed based on opening of valve 34*a* or a detection value from the liquid level sensor provided in container 140 or container 50.

When discharge of the waste solution has not been completed (NO in S2), computer 500 repeats processing in S2. When discharge of the waste solution has been completed (YES in S2), computer 500 controls valve 31*a* to introduce the oxidizing agent accommodated in container 110 into container 50 (S3).

Then, computer 500 determines whether or not introduction of the oxidizing agent has been completed (S4). For example, computer 500 determines whether or not introduction of the oxidizing agent has been completed based on opening of valve 31*a* or a detection value from the liquid level sensor provided in container 110 or container 50.

When introduction of the oxidizing agent has not been completed (NO in S4), computer 500 repeats processing in S4. When introduction of the oxidizing agent has been completed (YES in 54), computer 500 controls constant-temperature stirrer 71 to stir the sample with stirring bar 72 while constant heat is applied to the sample (S5).

Then, computer 500 determines whether or not stirring of the sample has been completed (S6). For example, computer 500 determines whether or not stirring of the sample has been completed based on a count value from a timer (not shown).

When stirring of the sample has not been completed (NO in 56), computer 500 repeats processing in S6. When stirring has been completed (YES in S6), computer 500 controls valve 34*a* and electromagnetic valve 41 to discharge to container 140, the waste solution in container 50 contained in the sample in which the organic contaminant has been decomposed (S7).

Then, computer 500 determines whether or not discharge of the waste solution has been completed (8). For example, computer 500 determines whether or not discharge of the waste solution has been completed based on opening of valve 34*a* or a detection value from the liquid level sensor provided in container 140 or container 50.

When discharge of the waste solution has not been completed (NO in S8), computer 500 repeats processing in S8. When discharge of the waste solution has been completed (YES in S8), computer 500 controls valve 33*a* to introduce the rinse solution accommodated in container 130 into container 50 (S9).

Then, computer 500 determines whether or not introduction of the rinse solution has been completed (S10). For example, computer 500 determines whether or not introduction of the rinse solution has been completed based on opening of valve 33*a* or a detection value from the liquid level sensor provided in container 130 or container 50.

When introduction of the rinse solution has not been completed (NO in S10), computer 500 repeats processing in S10. When introduction of the rinse solution has been completed (YES in S10), computer 500 controls valve 34*a* and electromagnetic valve 41 to discharge the waste solution in container 50 into which the rinse solution has been introduced to container 140 (S11).

Then, computer 500 determines whether or not discharge of the waste solution has been completed (S12). For example, computer 500 determines whether or not discharge of the waste solution has been completed based on opening of valve 34*a* or a detection value from the liquid level sensor provided in container 140 or container 50.

When discharge of the waste solution has not been completed (NO in S12), computer 500 repeats processing in S12. When discharge of the waste solution has been completed (YES in S12), computer 500 controls valve 32a to introduce the heavy solution accommodated in container 120 into container 50 (S13).

Then, computer 500 determines whether or not introduction of the heavy solution has been completed (S13). For example, computer 500 determines whether or not introduction of the heavy solution has been completed based on opening of valve 32a or a detection value from the liquid level sensor provided in container 120 or container 50.

When introduction of the heavy solution has not been completed (NO in S14), computer 500 repeats processing in S14.

As the heavy solution is thus introduced, an inorganic contaminant contained in the sample settles around the bottom of container 50 owing to the specific gravity difference, while the supernatant of the sample is flowed out to the outside through flow-out port 20 and flow-out pipe 25. Then, the supernatant of the sample flowed out through flow-out pipe 25 is filtered through detection filter 21, which collects microplastic.

When introduction of the heavy solution has been completed (YES in S14), that is, after microplastic is collected by gravity separation over approximately one day, computer 500 controls valve 34a and electromagnetic valve 41 to discharge the waste solution in container 50 from which microplastic has been collected to container 150.

Then, computer 500 determines whether or not discharge of the waste solution has been completed (S16). For example, computer 500 determines whether or not discharge of the waste solution has been completed based on opening of valve 34a or a detection value from a liquid level sensor provided in container 150 or container 50.

When discharge of the waste solution has not been completed (NO in S16), computer 500 repeats processing in S16. When discharge of the waste solution has been completed (YES in S16), computer 500 controls valve 33a to introduce the rinse solution accommodated in container 130 into container 50 (S17).

Then, computer 500 determines whether or not introduction of the rinse solution has been completed (S18). For example, computer 500 determines whether or not introduction of the rinse solution has been completed based on opening of valve 33a or a detection value from the liquid level sensor provided in container 130 or container 50.

When introduction of the rinse solution has not been completed (NO in S18), computer 500 repeats processing in S18. When introduction of the rinse solution has been completed (YES in S18), computer 500 controls valve 34a and electromagnetic valve 41 to discharge the waste solution in container 50 into which the rinse solution has been introduced to container 150 (S19) and quits the present process.

Through such post-treatment as introduction of the rinse solution and discharge of the waste solution, the inside of container 50 is cleaned.

As set forth above, according to sample purification apparatus 1 according to the present embodiment, as computer 500 executes control program 511, the oxidizing agent and the heavy solution are automatically introduced to the sample accommodated in container 50 and the waste solution is discharged from container 50 at appropriate timing for an appropriate period of time. Therefore, the user himself/herself does not have to introduce the oxidizing agent and the heavy solution into container 50 and to discharge the waste solution from container 50. Time and efforts of the user are not required or variation in accuracy in collection of a component depending on skills of each user is unlikely, and the user can accurately purify the sample with time and efforts being minimized.

Furthermore, according to sample purification apparatus 1 according to the present embodiment, computer 500 executes control program 511 to automatically clean used container 50 after microplastic is collected. Therefore, the user himself/herself does not have to clean container 50 so that time and efforts are minimized.

[Shape of Container of Sample Purification Apparatus]

Figure 15:
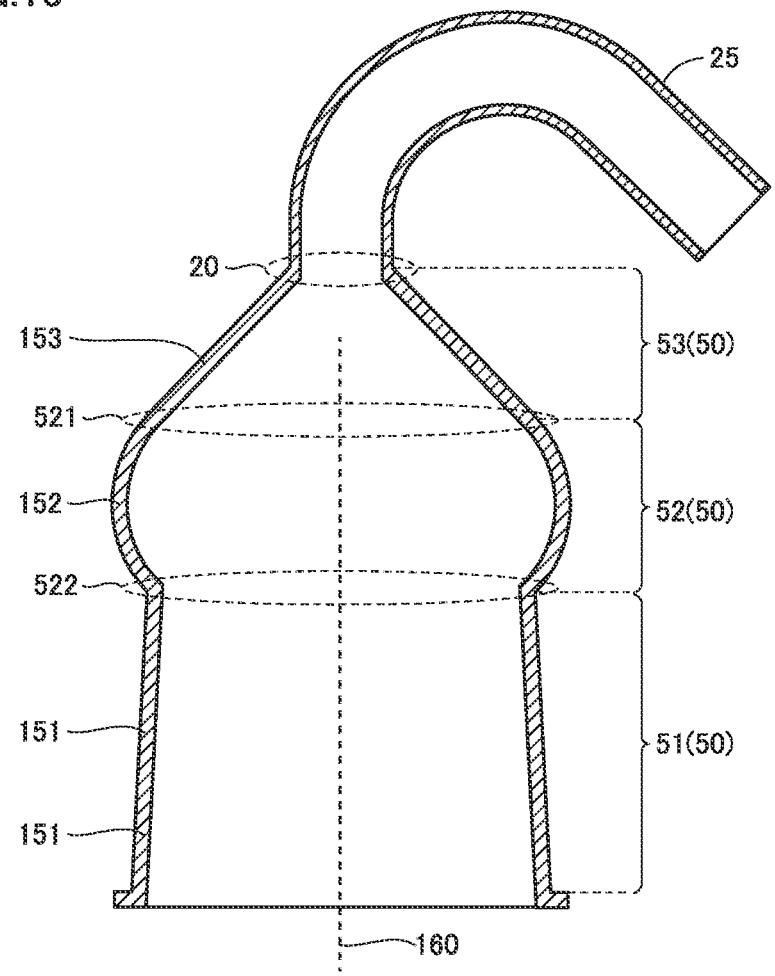
FIG. 15 is a diagram for illustrating a shape of a container in the sample purification apparatus according to the present embodiment.
Figure 16:
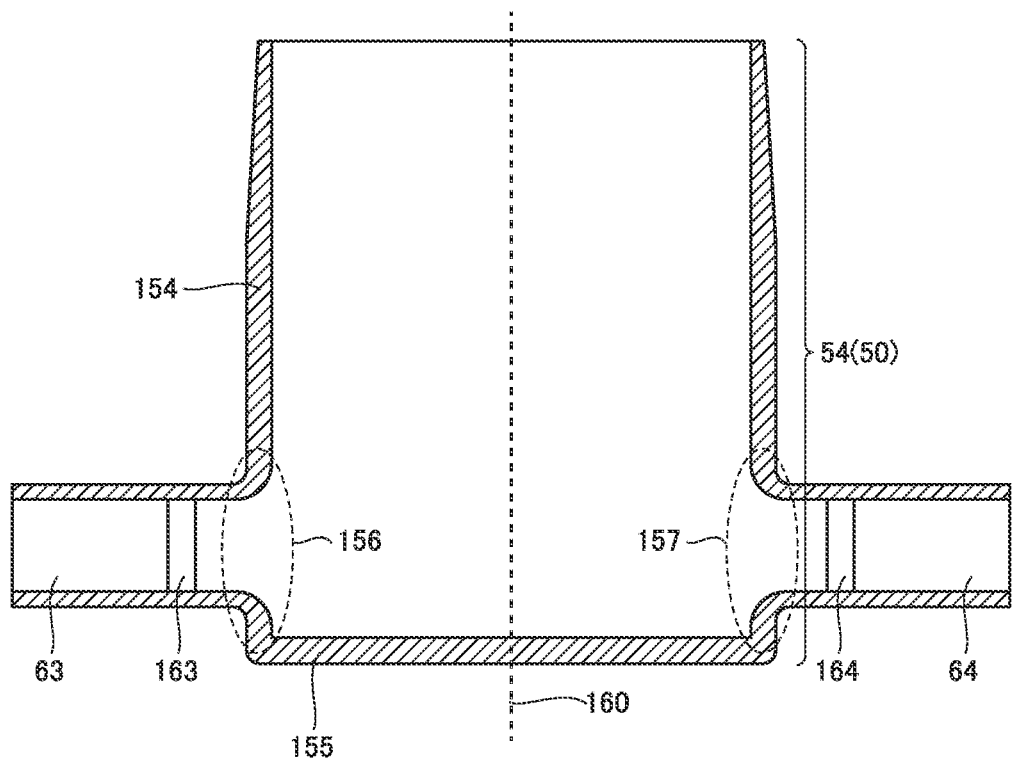
FIG. 16 is a diagram for illustrating the shape of the container in the sample purification apparatus according to the present embodiment.

FIGS. 15 and 16 are diagrams for illustrating a shape of container 50 in sample purification apparatus 1 according to the present embodiment. As described above, in sample purification apparatus 1, the sample can be purified with the use of container 50 in sample purification instrument 100. The shape of container 50 is devised to accurately purify the sample.

Specifically, as shown in FIGS. 15 and 16, container 50 includes main body portions 51 to 54. Main body portion 51 represents an exemplary "first main body portion." Main body portion 52 represents an exemplary "second main body portion." Main body portion 53 represents an exemplary "third main body portion."

Main body portion 54 is located at a lowermost portion of the container and includes a bottom surface 155 and a side surface 154. Side surface 154 of main body portion 54 is formed to surround a central axis 160 of columnar container 50, and in a part thereof, a hole 156 leading to port 63 and a hole 157 leading to port 64 are provided. In the inside of port 63, filter 163 is provided. In the inside of port 64, filter 164 is provided. Each of port 63 (hole 156) and port 64 (hole 157) is provided at a position below a central portion of main body portion 54 and in a portion close to bottom surface 155. Though not shown, a filter is provided also in the inside of each of other ports 61 and 62.

Main body portion 51 is provided above main body portion 54 and includes a side surface 151 formed as being contiguous to side surface 154 of main body portion 54. Side surface 151 is formed to surround central axis 160 of container 50 and to increase in diameter downward (toward bottom surface 155) from an upper side of container 50 (a side of flow-out port 20).

Main body portion 52 is provided above main body portion 51 and includes a side surface 152 formed as being contiguous to side surface 151 of main body portion 51. Side surface 152 is formed to surround central axis 160 of container 50 and to expand from an upper portion 521 and a lower portion 522 of main body portion 52 toward a portion located between upper portion 521 and lower portion 522. In other words, side surface 152 is formed to expand from central axis 160 of container 50 toward an outer circumferential side of main body portion 52. From another point of view, a horizontal cross-sectional area (or an inner diameter) of main body portion 52 is constructed to continuously increase from each of upper portion 521 and lower portion 522 of main body portion 52 toward the portion located between upper portion 521 and lower portion 522.

Main body portion 53 is provided above main body portion 52 and includes a side surface 153 formed as being contiguous to side surface 152 of main body portion 52. Side surface 153 is formed to surround central axis 160 of container 50 and to be tapered upward (the side of flow-out port 20) from a lower side of container 50 (a side of bottom surface 155). From another point of view, a horizontal cross-sectional area (or an inner diameter) of main body portion 53 is constructed to continuously decrease in an upward direction where flow-out port 20 is located. The horizontal cross-sectional area (or the inner diameter) of container 50 is thus constructed to continuously decrease upward between at least a prescribed height of container 50 (in this example, a height where upper portion 521 of main body portion 52 is located) and flow-out port 20. Though side surface 153 of main body portion 53 is linear in the present embodiment, it may be curved, and the horizontal cross-sectional area (or the inner diameter) of main body portion 53 should only be constructed to continuously decrease in the upward direction where flow-out port 20 is located.

Flow-out port 20 is a hole which is provided at a position opposed to bottom surface 155 of container 50, as being contiguous to side surface 153 of container 50, and leads to flow-out pipe 25. Flow-out port 20 is smaller in horizontal cross-sectional area (or inner diameter) than each of upper portion 521 and lower portion 522 of main body portion 52.

Main body portion 53 is formed as being integrated with main body portion 52. Main body portion 52 and main body portion 51 can be separated from each other, and the user can open container 50 by separating main body portion 52 from main body portion 51 to feed the sample into container 50.

As set forth above, according to sample purification apparatus 1 according to the present embodiment, side surface 153 of a part of container 50 is formed as being tapered from the side of bottom surface 155 toward flow-out port 20. In other words, the horizontal cross-sectional area of container 50 is constructed to continuously decrease upward between the at least prescribed height of container 50 and flow-out port 20. Therefore, a boundary between side surface 153 of container 50 and flow-out port 20 can be smoothened as much as possible. Thus, in flowing out of the supernatant of the sample separated by gravity with the use of the heavy solution to the outside through flow-out port 20, retention of microplastic in container 50 can be prevented as much as possible. For example, when the boundary between the side surface of container 50 and flow-out port 20 is not smooth but square-cornered, the supernatant of the sample separated by gravity with the use of the heavy solution may impinge on the square-cornered portion and microplastic to be collected may adhere to the inside of container 50, and the microplastic may be retained in container 50 without moving to flow-out port 20. In contrast, the boundary between side surface 153 of container 50 and flow-out port 20 is smoothened as much as possible as in container 50 according to the present embodiment, so that adhesion and retention of microplastic in container 50 can be prevented as much as possible. Therefore, the user can accurately purify the sample.

Since side surface 152 in a part of container 50 is formed to expand from upper portion 521 and lower portion 522 toward the portion located between upper portion 521 and lower portion 522, adhesion and retention of microplastic in container 50 can be prevented as much as possible. Furthermore, side surface 152 of the part (main body portion 52) of container 50 once expands, and additionally thereabove, the horizontal cross-sectional area of the part (main body portion 53) of container 50 continuously decreases toward flow-out port 20. Therefore, the supernatant of the sample that has risen by introduction of the heavy solution can spread in main body portion 52, and thereafter, owing to the tapered portion of main body portion 53, the supernatant can be directed to flow-out port 20 with great strength.

Since tapered main body portion 53 and main body portion 52 formed to expand are formed as being integrated with each other, strength of container 50 can be enhanced. Furthermore, since there is no boundary between main body portion 53 and main body portion 52, the supernatant of the sample that has risen owing to introduction of the heavy solution does not adhere to the boundary between main body portion 53 and main body portion 52 and the supernatant can more efficiently be directed to flow-out port 20.

[Analysis System]

Figure 17:
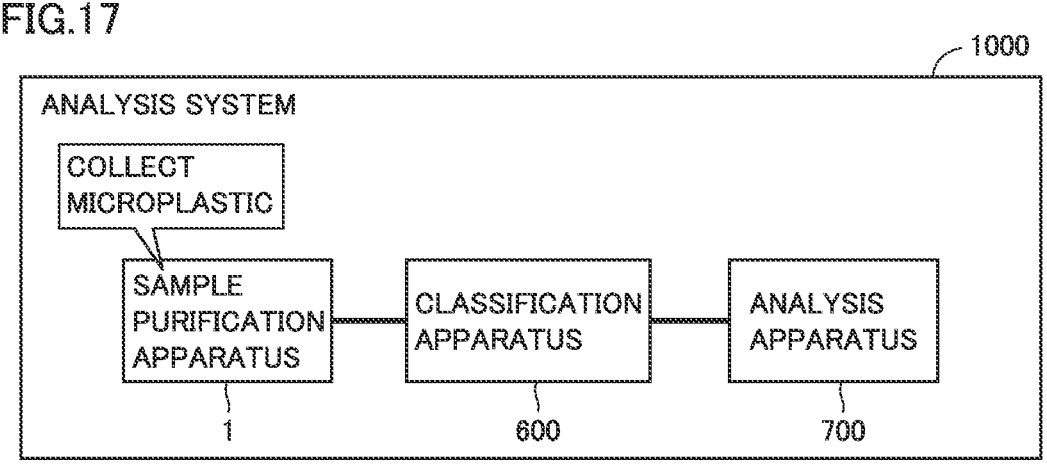
FIG. 17 is a diagram schematically showing an analysis system according to the present embodiment.

FIG. 17 is a diagram schematically showing an analysis system 1000 according to the present embodiment. Analysis system 1000 includes sample purification apparatus 1 according to the present embodiment described above, a classification apparatus 600, and an analysis apparatus 700.

Classification apparatus 600 classifies microplastic collected by sample purification apparatus 1 for each size of particles. An exemplary classification apparatus 600 includes a field flow fractionation apparatus that classifies particles with the use of centrifugation.

Analysis apparatus 700 analyzes microplastic classified by classification apparatus 600. As an analysis result obtained by analysis apparatus 700 is shown on a screen (not shown), a user obtains the analysis result.

In analysis system 1000 configured as described above, under the control by computer 500, sample purification apparatus 1 collects microplastic, and thereafter classification apparatus 600 classifies microplastic and analysis apparatus 700 analyzes the microplastic.

As set forth above, according to analysis system 1000 according to the present embodiment, since a series of works from introduction of the sample into sample purification apparatus 1 until analysis of microplastic by analysis apparatus 700 is automated by control by computer 500, convenience of the user is improved.

Analysis system 1000 does not have to include classification apparatus 600, and analysis apparatus 700 may directly obtain microplastic collected by sample purification apparatus 1 and then analyze the same.

[Modification]

Though sample purification apparatus 1 and analysis system 1000 according to the present embodiment are described above, the configuration thereof can further variously be modified and applied. A modification will be described below.

Figure 18:
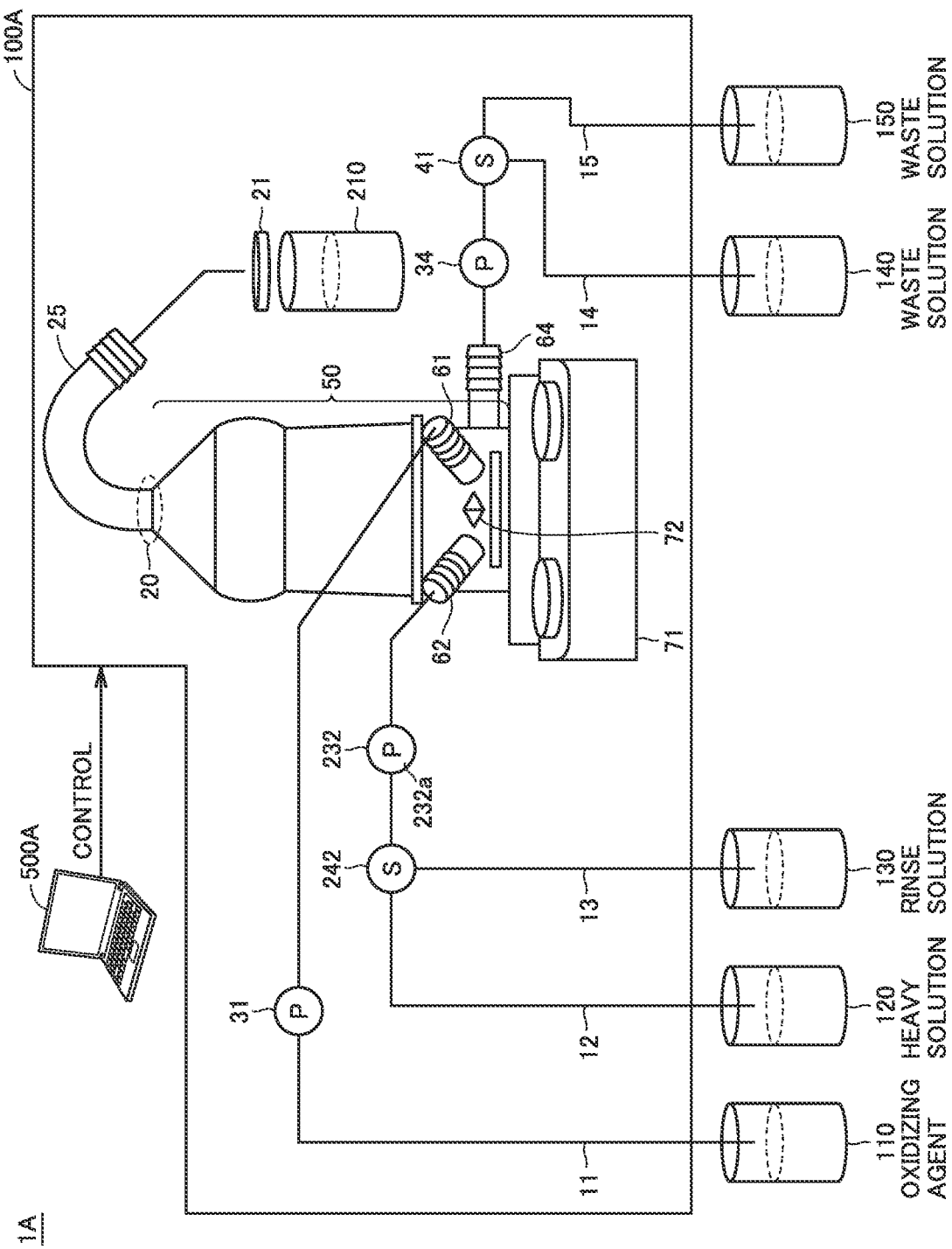
FIG. 18 is a diagram schematically showing a sample purification apparatus according to a second embodiment.

FIG. 18 is a diagram schematically showing a sample purification apparatus 1A according to a second embodiment. As shown in FIG. 18, in a sample purification instrument 100A of sample purification apparatus 1A, through pipe 12 for introduction of the heavy solution and pipe 13 for introduction of the rinse solution, solutions may be introduced to port 62 common therebetween.

Specifically, a pump 232 (a valve 232a) and an electromagnetic valve 242 are provided between each of pipes 12 and 13 and port 62 of container 50.

Electromagnetic valve 242 operates under the control by a computer 500A to switch a path for passage of a solution between a path between pipe 12 and pump 232 and a path between pipe 13 and pump 232.

Thus, the heavy solution suctioned from container 120 through pipe 12 is introduced to port 62 through electromagnetic valve 242 and pump 232. The rinse solution suctioned from container 130 through pipe 13 is introduced to port 62 through electromagnetic valve 242 and pump 232.

As set forth above, according to sample purification apparatus 1A according to the second embodiment, pump 232 (valve 232a) provided between pipe 12 and port 62 of container 50 is identical to pump 232 (valve 232a) provided between pipe 13 and port 62 of container 50, so that the number of parts of sample purification apparatus 1A can be reduced and cost can be suppressed.

Figure 19:
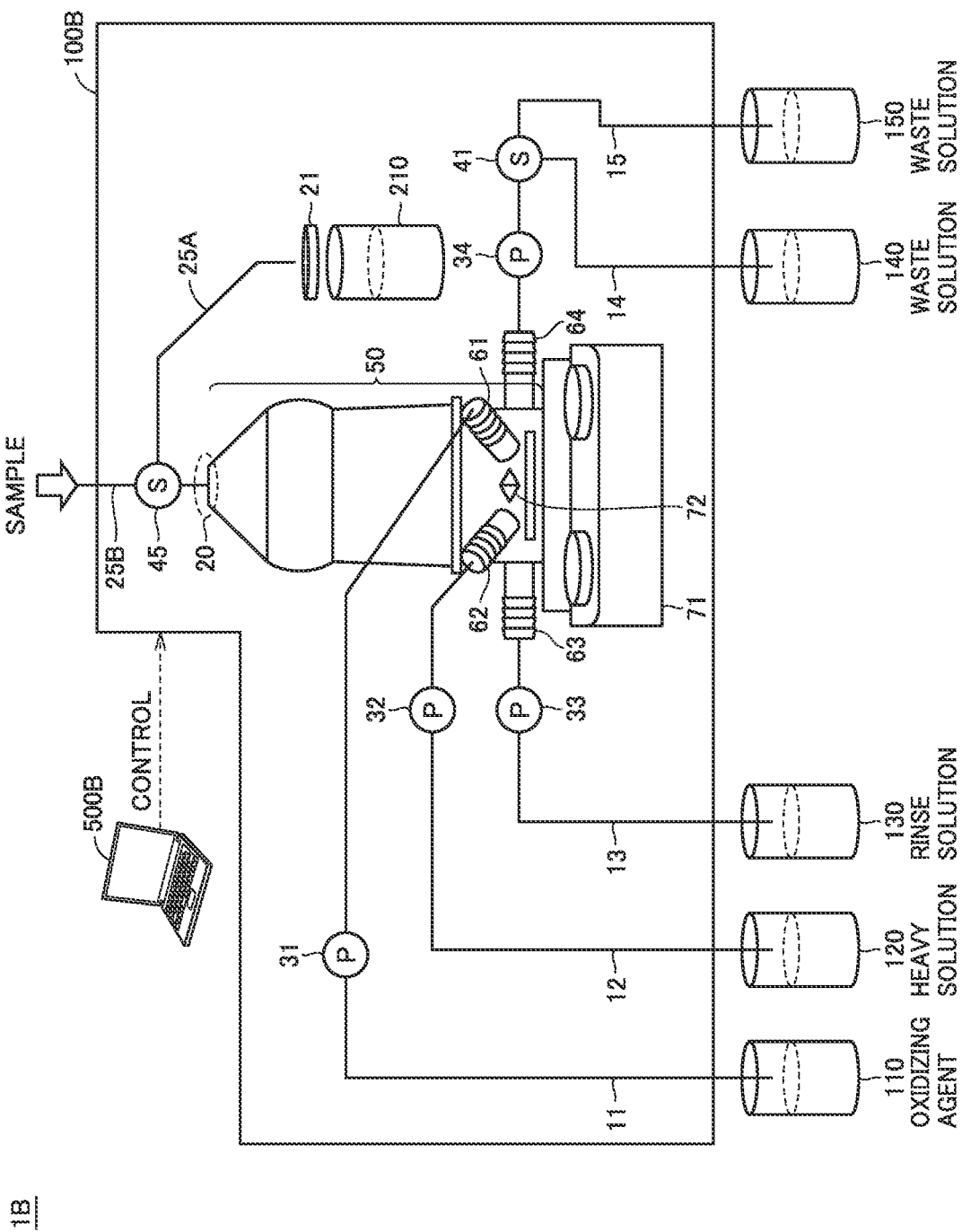
FIG. 19 is a diagram schematically showing a sample purification apparatus according to a third embodiment.

FIG. 19 is a diagram schematically showing a sample purification apparatus 1B according to a third embodiment. As shown in FIG. 19, a sample purification instrument 100B of sample purification apparatus 1B may be constructed to introduce a sample from above container 50.

Specifically, sample purification instrument 100B includes a flow-out pipe 25A through which the supernatant of the sample that overflows container 50 is flowed out toward detection filter 21 and an introduction pipe 25B through which the sample containing microplastic is introduced from the outside into container 50. Flow-out pipe 25A represents an exemplary "flow-out path" and introduction pipe 25B represents an exemplary "introduction path." An electromagnetic valve 45 is provided between each of flow-out pipe 25A and introduction pipe 25B and flow-out port 20 of container 50. Electromagnetic valve 45 operates under the control by a computer 500B to switch a path for passage of a solution between a path between flow-out pipe 25A and flow-out port 20 and a path between introduction pipe 25B and flow-out port 20.

Thus, under the control by computer 500B, the supernatant of the sample that overflows container 50 is flowed out to detection filter 21 through electromagnetic valve 45 and flow-out pipe 25A. Under the control by computer 500B, an externally introduced sample is introduced into container 50 through introduction pipe 25B and electromagnetic valve 45.

As set forth above, according to sample purification apparatus 1B according to the third embodiment, the sample can be introduced from above container 50 by making use of flow-out port 20, so that more convenient sample purification apparatus 1B can be provided to the user.

[Aspects]

Illustrative embodiments described above are understood by a person skilled in the art as specific examples of aspects below.

(Clause 1) A sample purification apparatus that purifies a mixed sample according to one aspect includes a container for separating, with a heavy solution, the mixed sample based on a specific gravity difference and a collector that collects a component in the mixed sample lighter in specific gravity than the heavy solution by receiving a supernatant flowed out from the container, the container includes a flow-out port provided in an uppermost portion of the container and a flow-out path that guides the supernatant flowed out through the flow-out port to the collector, and the container has a horizontal cross-sectional area which gradually decreases upward starting from a prescribed height of the container to a height where the flow-out port is located.

According to the sample purification apparatus described in Clause 1, the horizontal cross-sectional area of the container is constructed to continuously decrease upward between at least the prescribed height of the container and the flow-out port, so that retention in the container, of the component to be collected in flowing out to the outside of the supernatant produced by introduction of the heavy solution can be prevented as much as possible. Therefore, the mixed sample can accurately be purified.

(Clause 2) In the sample purification apparatus described in Clause 1, the container includes a first main body portion, a second main body portion provided above the first main body portion, and a third main body portion provided above the second main body portion, a horizontal cross-sectional area of the third main body portion is constructed to continuously decrease in an upward direction where the flow-out port is located, and a horizontal cross-sectional area of the second main body portion is constructed to continuously increase from each of an upper portion and a lower portion of the second main body portion toward a portion located between the upper portion and the lower portion.

According to the sample purification apparatus described in Clause 2, adhesion and retention of the component to be collected in the container can be prevented as much as possible. Furthermore, the second main body portion of container 50 once expands, and additionally thereabove, the horizontal cross-sectional area of the third main body portion of container 50 continuously decreases toward the flow-out port. Therefore, the supernatant of the mixed sample that has risen by introduction of the heavy solution can spread in the second main body portion, and thereafter, owing to the tapered portion of the third main body portion, the supernatant can be directed to the flow-out port with great strength.

(Clause 3) In the sample purification apparatus described in Clause 2, the third main body portion is formed as being integrated with the second main body portion. According to the sample purification apparatus described in Clause 3, since the tapered third main body portion and the second main body portion formed to expand are formed as being integrated with each other, strength of the container can be enhanced. Furthermore, since there is no boundary between the third main body portion and the second main body portion, the supernatant of the mixed sample that has risen owing to introduction of the heavy solution does not adhere to the boundary between the third main body portion and the second main body portion and the supernatant can more efficiently be directed to the flow-out port.

(Clause 4) The sample purification apparatus described in any one of Clauses 1 to 3 includes a first pipe for introduction into the container, of an oxidizing agent for treatment of a contaminant contained in the mixed sample, a second pipe for introduction of the heavy solution into the container, a third pipe for discharge of a waste solution in the container, a fourth pipe for introduction into the container, of a rinse solution for cleaning of the inside of the container, and at least one port provided in the container, a solution coming in and going out between the at least one port and the first pipe, the second pipe, the third pipe, and the fourth pipe.

According to the sample purification apparatus described in Clause 4, since the mixed sample can be purified through successive works with the use of a single container, the mixed sample can accurately be purified with time and efforts of a user such as a worker being minimized.

(Clause 5) In the sample purification apparatus described in Clause 4, the at least one port corresponding to each of the first pipe, the second pipe, and the fourth pipe is different from the at least one port corresponding to the third pipe.

According to the sample purification apparatus described in Clause 5, since the port through which a solution passes can be different between the pipe through which the solution (the oxidizing agent, the heavy solution, or the rinse solution) is introduced into the container and the pipe through which the waste solution is flowed out from the container to the outside, the mixed sample can more accurately be purified.

(Clause 6) In the sample purification apparatus described in Clause 4, the at least one port corresponding to the second pipe is identical to the at least one port corresponding to the fourth pipe.

According to the sample purification apparatus described in Clause 6, the number of parts of the sample purification apparatus can be reduced and cost can be suppressed.

(Clause 7) In the sample purification apparatus described in any one of Clauses 4 to 6, the at least one port includes a filter.

According to the sample purification apparatus described in Clause 7, discharge to the outside, of a component to be collected that is contained in the mixed sample can be prevented as much as possible.

(Clause 8) In the sample purification apparatus described in any one of Clauses 1 to 7, the flow-out port is connected to the flow-out path, and connected to an introduction path for introduction of the mixed sample into the container.

According to the sample purification apparatus described in Clause 8, the mixed sample can be introduced from above the container by making use of the flow-out port, so that a more convenient sample purification apparatus can be provided to the user.

(Clause 9) The sample purification apparatus described in Clause 8 includes at least one switching unit provided between each of the introduction path and the flow-out path and the flow-out port, the at least one switching unit switching between entry and exit of a solution.

According to the sample purification apparatus described in Clause 9, since the mixed sample can be purified with the use of the switching unit, the mixed sample can accurately be purified with time and efforts of a user being minimized.

(Clause 10) An analysis system according to one aspect includes the sample purification apparatus described in any one of Clauses 1 to 9 and an analysis apparatus that analyzes the component collected by the collector of the sample purification apparatus.

According to the analysis system described in Clause 10, since a series of works from introduction of the mixed sample into the sample purification apparatus until analysis of the component to be collected by the analysis apparatus is automated by control by the control unit, convenience of the user is improved.

REFERENCE SIGNS LIST 1, 1A, 1B sample purification apparatus; 11, 12, 13, 14, 15 pipe; 20 flow-out port; 21 detection filter; 25, 25A flow-out pipe; 25B introduction pipe; 31, 32, 33, 34, 232 pump; 31*a*, 32*a*, 33*a*, 34*a*, 232*a* valve; 41, 45, 242 electromagnetic valve; 50, 110, 120, 130, 140, 150, 210 container; 51, 52, 53, 54 main body portion; 61, 62, 63, 64 port; 71 constant-temperature stirrer; 72 stirring bar; 100, 100A, 100B sample purification instrument; 151, 152, 153, 154 side surface; 155 bottom surface; 156, 157 hole; 160 central axis; 163, 164 filter; 500, 500A, 500B computer; 501 computing device; 502 memory; 503 network controller; 504 display device; 505 input device; 506 data reading device; 507 storage medium; 510 storage; 511 control program; 512 control data; 521 upper portion; 522 lower portion; 600 classification apparatus; 700 analysis apparatus; 1000 analysis system

The invention claimed is:

1. A sample purification apparatus that purifies a mixed sample, the sample purification apparatus comprising:
    a container for separating, with a heavy solution, the mixed sample based on a specific gravity difference, the container having a central axis direction; and
    a collector that collects a component in the mixed sample lighter in specific gravity than the heavy solution by receiving a supernatant flowed out from the container, wherein
    the container includes
        a flow-out port provided at an uppermost end of the container in the central axis direction, wherein the flow-out port is located on the central axis, and
        a flow-out path that guides the supernatant flowed out through the flow-out port to the collector, and
        the container has a horizontal cross-sectional area which decreases upward starting from a prescribed height of the container to a height where the flow-out port is located.

2. The sample purification apparatus according to claim 1, wherein
    the container includes a first main body portion, a second main body portion provided above the first main body portion, and a third main body portion provided above the second main body portion,
    a horizontal cross-sectional area of the third main body portion is constructed to continuously decrease in an upward direction where the flow-out port is located, and
    a horizontal cross-sectional area of the second main body portion is constructed to continuously increase from each of an upper portion and a lower portion of the second main body portion toward a portion located between the upper portion and the lower portion.

3. The sample purification apparatus according to claim 2, wherein
    the third main body portion is formed as being integrated with the second main body portion.

4. The sample purification apparatus according to claim 1, wherein
    the flow-out port is connected to the flow-out path and connected to an introduction path for introduction of the mixed sample into the container.

5. The sample purification apparatus according to claim 4, comprising at least one switching unit provided between each of the introduction path and the flow-out path and the flow-out port, the at least one switching unit switching between entry and exit of a solution.

6. The sample purification apparatus according to claim 1, comprising:
    a first pipe for introduction into the container, of an oxidizing agent for treatment of a contaminant contained in the mixed sample;
    a second pipe for introduction of the heavy solution into the container;
    a third pipe for discharge of a waste solution in the container; and
    a fourth pipe for introduction into the container, of a rinse solution for cleaning of inside of the container; and
    at least one port provided in the container, a solution coming in and going out between the at least one port and the first pipe, the second pipe, the third pipe, and the fourth pipe.

7. The sample purification apparatus according to claim 6, wherein
    the at least one port corresponding to each of the first pipe, the second pipe, and the fourth pipe is different from the at least one port corresponding to the third pipe.

8. The sample purification apparatus according to claim 6, wherein
    the at least one port corresponding to the second pipe is identical to the at least one port corresponding to the fourth pipe.

9. The sample purification apparatus according to claim 6, wherein
the at least one port includes a filter.

10. An analysis system comprising:
the sample purification apparatus according to claim 1; and
an analysis apparatus that analyzes the component collected by the collector of the sample purification apparatus.

* * * * *